(12) United States Patent
Lai et al.

(10) Patent No.: US 8,280,853 B1
(45) Date of Patent: Oct. 2, 2012

(54) DYNAMIC STORAGE MECHANISM

(75) Inventors: Xinyi David Lai, Danville, CA (US);
Par Botes, Mountain View, CA (US);
HanCheng Hsiung, Union City, CA (US)

(73) Assignee: Symantec Operating Corporation, Mountain View, CA (US)

( * ) Notice: Subject to any disclaimer, the term of this patent is extended or adjusted under 35 U.S.C. 154(b) by 705 days.

(21) Appl. No.: 12/415,125

(22) Filed: Mar. 31, 2009

Related U.S. Application Data

(62) Division of application No. 10/750,401, filed on Dec. 31, 2003.

(51) Int. Cl.
*G06F 7/00* (2006.01)
*G06F 17/00* (2006.01)

(52) U.S. Cl. ......... 707/651; 707/661; 707/822; 707/829

(58) Field of Classification Search ............... 707/999.1, 707/999.101, 999.2–999.205, 822, 825; 709/224
See application file for complete search history.

(56) References Cited

U.S. PATENT DOCUMENTS

| | | |
|---|---|---|
| 5,278,970 A | 1/1994 | Pence |
| 5,475,834 A | 12/1995 | Anglin et al. |
| 5,822,780 A | 10/1998 | Schutzman |
| 5,881,311 A * | 3/1999 | Woods .............................. 710/4 |
| 6,029,179 A | 2/2000 | Kishi |
| 6,311,252 B1 | 10/2001 | Raz |
| 6,330,572 B1 | 12/2001 | Sitka |
| 6,684,231 B1 | 1/2004 | Cabrera et al. |
| 6,804,719 B1 | 10/2004 | Cabrera et al. |
| 6,938,039 B1 | 8/2005 | Bober et al. |
| 6,947,959 B1 | 9/2005 | Gill |
| 6,961,811 B2 | 11/2005 | Dawson et al. |
| 6,981,005 B1 * | 12/2005 | Cabrera et al. ........................ 1/1 |
| 7,007,048 B1 | 2/2006 | Murray et al. |

(Continued)

OTHER PUBLICATIONS

"DiskXtender for UNIX System Administrator Guide—Release 2.5," Legato Systems, On., Feb. 2003, (30 pages).

(Continued)

*Primary Examiner* — Robert Beausoliel
*Assistant Examiner* — Susan F Rayyan
(74) *Attorney, Agent, or Firm* — Robert C. Kowert; Meyertons, Hood, Kivlin, Kowert & Goetzel, P.C.

(57) ABSTRACT

System and method for tracking statistics at the subfile level and transparently placing or migrating inactive or less active blocks of data to other storage devices. Embodiments may provide mechanisms to track statistics at the subfile level of files including, but not limited to, database files, and to transparently place or migrate inactive or less active blocks of data of the files from higher-performing, typically more expensive, storage to lower-performing, typically less expensive, storage, while placing or migrating active blocks of data of the files to higher-performing storage, based on the subfile-level statistics rather than on file-level timestamps. In some embodiments, knowledge of file structure (e.g., database file structure), for example knowledge of database partitions with header blocks and data blocks in databases using data partitioning, may be used to separate more active and less active blocks of data of files onto storage with different performance and/or other characteristics.

29 Claims, 14 Drawing Sheets

U.S. PATENT DOCUMENTS

| | | | |
|---|---|---|---|
| 7,058,664 B1 * | 6/2006 | Hsu ............................. | 707/676 |
| 7,072,914 B2 | 7/2006 | Cabrera et al. | |
| 7,225,211 B1 | 5/2007 | Colgrove et al. | |
| 7,293,133 B1 | 11/2007 | Colgrove et al. | |
| 2002/0069324 A1 | 6/2002 | Gerasimov et al. | |
| 2002/0120763 A1 | 8/2002 | Miloushev et al. | |
| 2003/0023713 A1 | 1/2003 | Slater et al. | |
| 2003/0046270 A1 | 3/2003 | Leung et al. | |
| 2003/0056069 A1 | 3/2003 | Cabrera et al. | |
| 2003/0065898 A1 | 4/2003 | Flamma et al. | |
| 2003/0225801 A1 | 12/2003 | Devarakonda et al. | |
| 2004/0039891 A1 * | 2/2004 | Leung et al. ................. | 711/165 |
| 2004/0049513 A1 * | 3/2004 | Yakir et al. .................... | 707/100 |
| 2004/0054656 A1 | 3/2004 | Leung et al. | |
| 2004/0163029 A1 | 8/2004 | Foley et al. | |
| 2004/0261021 A1 | 12/2004 | Mittal et al. | |
| 2004/0267822 A1 * | 12/2004 | Curran et al. ................ | 707/200 |
| 2005/0033757 A1 | 2/2005 | Greenblatt et al. | |
| 2005/0071560 A1 | 3/2005 | Bolik | |
| 2005/0203964 A1 | 9/2005 | Matsunami et al. | |

OTHER PUBLICATIONS

Mark Hoover, "Accidental Value," Acuitive, Inc., Hoov's Musings (vol. 6, No. 6), www.acuitive.com/musings/hmv6-6.htm, Jun. 2003(4 pages).

Richard McDougal, "Getting to know the Solaris File System, Part 1," www.solarisinternals.com/si/reading/sunworldonline, May 1999, (16 pages).

Veritas Software Corporation, "File System," White Paper, Nov. 1996, 17 pages.

Philip Trautman, SGI, "Scalability and Performance in Modern Filesystems," White Paper, 2000, 14 pages.

Digital Equipment Corporation, "Advanced File System and Utilities for Digital UNIX, Guide to File System Administration," Version 4.0, Apr. 1996, 158 pages.

Compaq, "Advanced File System Quick Reference," Jan. 2002, 66 pages.

IBM, "IBM Tivoli Storage Manager," 2002, 6 pages.

Hewlett Packard, "Specifying Data Availability in Multi-Device File Systems," John Wilkes, et al., Apr. 1, 1990, pp. 56-59.

* cited by examiner

| MyDrive/MyFolder/MyFile | First Storage Class:Device:Block Number |

*FIG. 8A*

| MyDrive/MyFolder/MyFile | Second Storage Class:Device:Block Number |

*FIG. 8B*

| MyDrive/MyFolder/MyFile | Third Storage Class:Device:Block Number |

*FIG. 8C*

| MyDrive/MyFolder/MyFile | First Storage Class:Device:Block Number |

*FIG. 8D*

DYNAMIC STORAGE MECHANISM

This application is a divisional of U.S. application Ser. No. 10/750,401, which was filed Dec. 31, 2003.

BACKGROUND OF THE INVENTION

1. Field of the Invention

This invention is related to the field of computer systems and, more particularly, to data storage systems.

2. Description of the Related Art

In data storage environments such as corporate LANs, total storage needs are increasing and storage costs are an increasing part of the IT budget. More and/or higher capacity storage devices may be added, but this solution is expensive and difficult to manage, and does not address the root of the problem. There is a limit to storage capacity no matter how much storage capacity is added. This solution tends to provide a constant cost per byte for storage, as it tends not to take advantage of lower cost-per-byte storage devices. A high percentage of data stored in a storage environment may be infrequently accessed, or never accessed at all after a certain time. Lower cost-per-byte for storage may be realized using methods that move at least some of this infrequently accessed data off more expensive storage devices and on to the less expensive storage devices.

Hierarchical Storage Management (HSM) is a data storage solution that provides access to vast amounts of storage space while reducing the administrative and storage costs associated with data storage. HSM systems may move files along a hierarchy of storage devices that may be ranked in terms of cost per megabyte of storage, speed of storage and retrieval, and overall capacity limits. Files are migrated along the hierarchy to less expensive forms of storage based on rules tied to the frequency of data access.

In HSM systems, data access response time and storage costs typically determine the appropriate combination of storage devices used. A typical three tier HSM architecture may include hard drives as primary storage, rewritable optical as secondary storage, and tape as tertiary storage. Alternatively, hard drives may be used for secondary storage, and WORM (Write Once, Read Many) optical may be used as tertiary storage.

Rather than making copies of files as in a backup system, HSM migrates files to other forms of storage, freeing hard disk space. Events such as crossing a storage threshold and/or reaching a certain file "age" may activate the migration process. As files are migrated off primary storage, HSM leaves stubs to the files on the hard drive(s). These stubs point to the location of the file on the alternative storage, and are used in automatic file retrieval and user access. The stub remains within the file system of the primary storage, but the file itself is migrated "offline" out of the file system onto the alternative storage (e.g. tape).

In HSM, when a file that has been migrated to a lower rank of storage, such as tape, is accessed by an application, the stub may be used to retrieve and restore the file from the lower rank of storage. The file appears to be accessed by the application from its initial storage location, and demigration of the file back into the file system is performed automatically by the HSM system using the stub. While on the surface this demigration may appear transparent to the user, in practice the process of accessing and restoring the file from offline storage (e.g. tape) may introduce a noticeable time delay (seconds, minutes, or even hours) to the user when compared to accessing files stored on primary storage. Thus, accessing offloaded data in an HSM system is typically non-transparent to the application or user because of the difference in access time. In addition, since HSM introduces a substantial time lag to access offloaded data, HSM systems typically only offload low access (essentially, no access) data.

A file system may be defined as a collection of files and file system metadata (e.g., directories and Modes) that, when set into a logical hierarchy, make up an organized, structured set of information. File systems may be mounted from a local system or remote system. File system software may include the system or application-level software that may be used to create, manage, and access file systems.

File system metadata may be defined as information that file system software maintains on files stored in the file system. File system metadata may include, but is not limited to, definitions and descriptions of the data it references. File system metadata may include one or more of, but is not limited to, inodes, directories, mapping information in the form of indirect blocks, superblocks, etc. Generally, file system metadata for a file includes path information for the file as seen from the application side and corresponding file system location information (e.g. device:block number(s)). File system metadata may itself be stored on a logical or physical device within a file system.

File systems may use data structures such as inodes to store file system metadata. An inode may be defined as a data structure holding information about files in a file system (e.g. a Unix file system). There is an inode for each file, and a file is uniquely identified by the file system on which it resides and its inode number on that system. An inode may include at least some of, but is not limited to, the following information: the device where the inode resides, locking information, mode and type of file, the number of links to the file, the owner's user and group IDs, the number of bytes in the file, access and modification times, the time the inode itself was last modified and the addresses of the file's blocks on disk (and/or pointers to indirect blocks that reference the file blocks).

Many databases provided by DBMS vendors (e.g. Oracle, IBM's DB2, etc) offer a feature called data partitioning which enables users to store data from a single table on different partitions in a file based on certain criteria. In a partitioned database, a partitioning key or keys may be used to partition table data across a set of database partitions. A database partition may include its own user data, indexes, configuration files, and transaction logs. An exemplary criterion that may be used as a key is time; for example, every month's sales data may be stored in separate partitions in one file. An enterprise may want to have some data in partitions online at all times, but some partitions may not be frequently accessed. Users still want to access the older partitions fairly easily, even if infrequently.

Database systems that support data partitioning may allow users to manually move older database partitions offline. However, once the database partitions are moved offline, they cannot be accessed unless they are brought back manually by the DBA. Therefore, the process is not transparent. For older or inactive database partitions, typically only the headers of the files are being accessed. However, the rest of the files are being kept on expensive storage unnecessarily.

Database users typically want to have their most frequently accessed data on the best quality storage. Given a database file, it is typical to have only a small region of a file that is heavily accessed, and other regions of the files that are infrequently accessed if at all. As the access patterns and workload change, the data may be manually migrated between higher quality and more costly storage and lower quality and less costly storage. It is not easy for users to constantly monitor the usages and move data accordingly. Even if they could, the movement of data is not a transparent process and may cause database down time. In at least some databases, including databases that support data partitioning, headers may be continuously updated and thus the database file may appear to be always current. In database systems that support data partitioning, even though the content of a partition may not have been accessed for a long time, the database engine may update a header block of the partition frequently, for example once every second. Even for a partition in which the data has not been accessed for a long time, the timestamp of the partition is always current. Thus, traditional HSM-like solutions may not work well for databases because they are based on the file-level timestamps of files, which may always be current in database files.

Some file systems may be extent-based, rather than block-based. An extent may be defined as one or more adjacent, or contiguous, blocks of storage within a file system. Extents, unlike blocks are not fixed size. Extent-based file systems allocate disk blocks in groups (extents), rather than one at a time, which results in sequential allocation of blocks. As a file is written, one or more extents may be allocated, after which writes can occur at the extent level. One or more extents may be allocated for one file. Using extents may make it less likely to have a fragmented file system.

SUMMARY

Embodiments of a system and method for tracking statistics at the subfile level and transparently placing or migrating inactive or less active blocks of data to other storage devices are described. Embodiments may provide mechanisms to track statistics at the subfile level of files including, but not limited to, database files, and to transparently place or migrate inactive or less active blocks of data of the files from higher-performing, typically more expensive, storage to lower-performing, typically less expensive, storage, while placing or migrating active blocks of data of the files to higher-performing storage, based on the subfile-level statistics rather than on file-level timestamps. The tracked subfile-level statistics may include, but are not limited to, file system I/O operation statistics at the subfile level, such as reads and/or writes to the data in the tracked file parts.

In embodiments, file system software monitors and maintains statistics on the subfile level (e.g. block, extent, or ranges of blocks). In embodiments, file system software may track subfile-level statistics, and may maintain the subfile-level statistics, for example, in memory or in a separate file or files in file system. The file system software may automatically and transparently place in or migrate parts of files to different classes of storage devices according to user-defined policies. In other embodiments, file system software may expose an application programming interface (API) to application software, such as DBMS (database management system) servers, to force the data placement or migration of all or part of files. Users may define the policies, and file system software may then automatically and transparently place or migrate more active parts of files on faster storage and less active or inactive parts of files on inexpensive or secondary storage according to the policies. In one embodiment, parts of a file that are frequently accessed, such as header blocks of a partitioned database file, may be placed in or migrated to a higher storage class including faster storage devices, and other parts of the file that are less frequently accessed may be placed or migrated to a lower storage class including slower, less expensive storage devices. Data remains online in the same file system regardless of which storage class the files or parts of files containing the data are stored in or migrated to.

In some embodiments, knowledge of file structure (e.g., database file structure), for example knowledge of database partitions with header blocks and data blocks in databases using data partitioning, may be used to separate more active and less active blocks of data of files onto storage with different performance and/or other characteristics. Using embodiments, unused database blocks may be moved to less expensive storage devices or even to offline storage to reduce storage costs without compromising performance. The sub-file-level migration may be performed transparently to the application(s) and users of the application(s).

In one embodiment, in extent-based file systems, subfile-level statistics for file parts may be tracked at the extent level, and extents may be migrated at the extent level according to the policies. In one embodiment, subfile-level statistics may be tracked for parts of extents (e.g. ranges of blocks within extents), and a part of an extent may be migrated by splitting the extent into two separate extents. Embodiments may also be implemented in non-extent-based file systems to track subfile-level statistics at the block and/or block range level to determine if some blocks or ranges of blocks can be migrated to other storage. In one embodiment, inactive data blocks of partitioned database files may be migrated to less expensive storage automatically and transparently while keeping the headers where they are on higher-performing storage. In one embodiment, new partitioned database files may be created with the headers allocated on a faster storage device and the data blocks allocated on a slower storage device, as further described below.

In one embodiment, the less expensive storage may be online, and the transparent data movement may be performed by the multi-class file system. In one embodiment, the less expensive storage may also include offline storage such as tape. However, after parts of the partitioned database (or other type of) file are migrated to different storage, the entire database file appears to the application(s) and/or user(s) to be online, when in fact only the database file header portion, perhaps a few file system blocks, is actually online.

BRIEF DESCRIPTION OF THE DRAWINGS

The following detailed description makes reference to the accompanying drawings, which are now briefly described.

FIGS. 8A through 8D illustrate an exemplary metadata structure for data that may be modified during assignment and migration of data in a multi-class file system according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for implementing a file system across different classes of storage in a storage system are described. Embodiments may define multiple classes of storage and automatically and transparently migrate data between the storage classes within the same file system to meet the usage needs of the business. This data may be migrated as files or portions of files, and may include, but is not limited to, application data and/or file system metadata. Embodiments may be used to transparently adapt the cost of storage to the usage patterns of data on the storage, thereby reducing the amount that customers need to spend for their storage. In embodiments, storage devices may be classified into two or more different classes of storage to implement a multi-class file system. Embodiments may provide a multi-class storage mechanism for managing and implementing sets of user-defined policies for assigning and migrating data within the multi-class file system.

Figure 1:
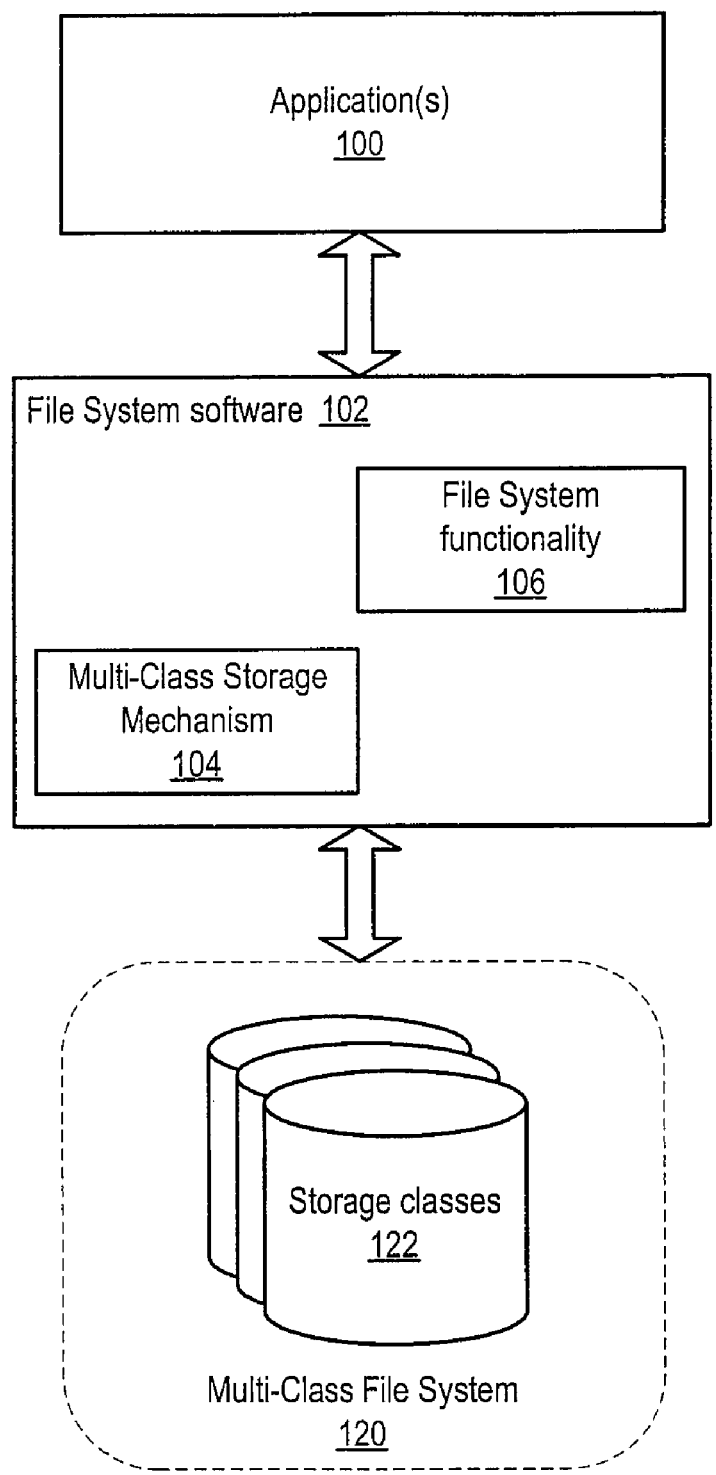
FIG. 1 illustrates file system software including a multi-class storage mechanism implementing multi-class file system according to one embodiment.

FIG. 1 illustrates file system software including a multi-class storage mechanism implementing a multi-class file system according to one embodiment. File system software 102 may include, but is not limited to, an embodiment of the multi-class storage mechanism 104 and software that provides "traditional" File System functionality 106. File System functionality 106 may be provided by any of various File System implementations including, but not limited to, disk-based file systems such as Veritas' VxFS and UNIX File System (UFS), and networked file system such as Network File System (NFS) and AT&T's Remote File Share (RFS).

File system software 102 may implement, on one or more storage devices, a multi-class file system 120. In one embodiment, the software that provides the File System functionality 106 may be used to implement the multi-class file system 120, while the multi-class storage mechanism 104 manages the policies and performs assignment and migration of data within the multi-class file system 120 according to the policies. The multi-class file system 120 may include one or more physical and/or logical storage devices organized in a hierarchy of two or more storage classes 122 according to one or more characteristics of the storage devices and/or data requirements of the user(s) of the file system. The multi-class file system 120 is made available to the application(s) 100 as one file system. The storage classes 122 of the multi-class file system 120 are transparent to the application(s) 100.

In embodiments, the multi-class storage mechanism 104 may make an automatic and transparent determination on where to initially place a file (i.e., in which storage class 122) according to the policies. The multi-class storage mechanism 104 may later relocate or migrate the file (or a portion of the file) to another storage class 122 according to the policies. A migrated file remains online within the file system, even if the file is moved to the lowest storage class 122; migration does not move files to offline storage.

In a multi-class file system 120, the same file system has multiple storage classes 122. Each storage class 122 is part of a single overall file system. As far as the user or application is concerned, the files are stored in the same logical storage location within the file system (e.g. a directory or folder). It is transparent from the application and/or user's perspective whether a file is on one storage class 122 or another, or if parts of a file are on different storage classes 122. From the application and/or user's perspective, the file appears to be in the same location in the file system where the user put it. Migrated data remains in the file system no matter which storage class it is migrated to. Migrated data remains active or online in the file system, and does not have to be restored from offline storage media in order to be accessed.

In one embodiment, the number of storage classes 122 in a multi-class file system 120 is configurable—there may be 2 to N user-defined storage classes 122 in a multi-class file system 120. As an example, a three-class file system may be implemented, and a first portion of the data (e.g. 5%) may be classified as most active data and may be placed in a highest storage class, a second portion of the data (e.g. 15%) may be classified as less active data and may be placed in a middle storage class, and a third portion of the data (e.g. 80%) may be classified as least active (or inactive) data and may be placed in a lowest storage class (without offloading the data to tape or other media). Thus, embodiments may preferably reduce cost of overall storage without significantly impacting performance, robustness, etc.

In embodiments, there may be multiple devices in the same storage class 122. A storage class 122 may be based, for example, on cost/performance characteristics of the storage devices. A storage class 122 may, for example, include five different devices, which may or may not be the same make and model, but all the devices are considered in the same storage class 122. If a file is put on a storage class 122, it may be stored to any of the devices in the storage class 122 (or alternatively across two or more devices in the storage class 122). In one embodiment, portions of a file may be stored or migrated to devices in two or more storage classes 122. For example, one or more active records of a database may be stored in a higher storage class 122 including high-performance storage devices, while less or inactive records of the database may be stored in or migrated to lower storage classes 122 including lower-performance storage devices.

In embodiments, storage classes 122 may be defined (e.g. by a user or administrator) based on one or more characteristics including, but not limited to, performance and cost of the storage. Storage devices do not have to be exactly similar in characteristics to be placed in the same storage class 122, but it may be preferable to place storage devices that are similar in one or more primary characteristics together in the same storage class 122. For example, storage devices may be grouped into storage classes 122 according to performance characteristics, with the fastest storage devices placed in a first (highest) storage class 122, and slower storage devices placed in lower storage classes 122. For example, two or more fast mirrored storage devices (which may be different makes or models) may be grouped in a first storage class, two or more RAID-5 devices may (which may be different makes or models) be grouped in a second storage class, even slower storage devices (which may be different makes or models) may be placed in a third storage class, and so on.

Embodiments may allow a user to define as many storage classes 122 as desired or required and to separate the storage classes 122 according to any characteristics the user desires or requires. In one embodiment, a user may further segment a storage class 122 into two or more subclasses of storage as desired or required. As examples, a storage class 122 may be segmented into subclasses for two or more departments of an enterprise to separate the departments' data onto different storage devices within the storage class, or into subclasses containing frequently-read data and less-frequently-read data, or into subclasses containing frequently-written data and frequently-read data, or into subclasses containing frequently-written data and less-frequently-written data. In this embodiment, the policies maintained and implemented by the multi-class storage mechanism 104 may specify, at the storage class and/or subclass level, storage classes and/or subclasses of a storage class to which certain files or portions of files are to be assigned and/or migrated.

Embodiments may provide business-oriented hierarchical management of online storage. Rather than simply migrating data to lower classes of storage based on how recently or frequently the data are accessed, embodiments may make migration decisions within the multi-class file system 120 based on one or more of other business-oriented factors. Embodiments may organize and migrate data in a multi-class file system 120 using policies oriented towards the business value of the data. The business value may be based, for example, on the user, application, department, etc that originated, owns, or most frequently accesses the data, time criticality of the data, and/or time of the data in a business or application cycle. Embodiments may implement classes of storage and place data in the storage classes 122 according to the business-oriented policies. In embodiments, files or portions of files may be placed in a storage class 122 and/or migrated to different storage classes 122 according to usage parameters and/or business-oriented parameters such as how valuable and/or important the data is, as determined by the predefined policies for evaluating the parameters. Embodiments may apply policies about the value, importance, and usage of the data, or even other factors such as ownership of the data (e.g. what department or user owns and/or accesses the data), within the multi-class file system 120 to preferably provide a lower underlying hardware cost with essentially the same responsiveness.

Policies used by the multi-class storage mechanism 104 may be based on file type, users, location, department, application, importance, value, or other factors in addition to file size and usage. The factors that policies may evaluate may be factors that are important to a business such as how valuable, critical, or important the data is, and how critical the response time is. For example, the policies may specify that a set of business-critical data that may be infrequently accessed should remain in a highest storage class, and/or that another set of data that is not as critical may be stored or migrated to a lower storage class regardless of the data's frequency of access. The data in the lower storage classes or even the lowest storage class, still within the same file system, may be accessed without having to be restored to the file system from offline storage, and may be migrated to higher storage classes transparently to the application and/or user if the policies, applied by the multi-class storage mechanism 104, indicate that migration of the files is necessary or desired.

Implementation of the policies may be performed at allocation time and/or during use. The policies may be implemented within the File System software 102, eliminating a level of interruption. In other embodiments, the policies may also be implemented in an external application software such as system monitoring software or DBMS engine.

Embodiments of the multi-class storage mechanism 104 may migrate data within the multi-class file system 120, no matter how busy the data is or whether the data is being used for read or write, if the policies indicate that the data is to be migrated. The multi-class storage mechanism 104 makes policy-based decisions about the importance, value, and/or usage of data and migrates the data to a storage class 122 with appropriate characteristics. The data remains online as part of the same file system, and the migration of the data is transparent to the user. Data, including application data and file system metadata, may be moved up or down in the multi-class file system 120 transparently to the user.

In one embodiment, the multi-class storage mechanism 104 may place or relocate parts of a file in different storage classes 122 according to the policies. For example, one part of a file that is frequently accessed may be placed in a higher storage class composed of faster storage devices, and another part of the file that is less frequently accessed may be migrated to a lower storage class composed of slower, less expensive storage devices. Data, including application data and file system metadata, remains active in the same file system regardless of which storage class 122 the files or parts of files containing the data are stored in or migrated to.

In one embodiment, file system metadata may be used to track the storage and migration of data in the multi-class file system 120. When a file or portion(s) of a file is stored in or migrated to a storage class, the file system metadata may be modified to indicate the location of the file or portion(s) of the file in the multi-class file system 120. From the application or user's perspective, the path to the file does not change when the metadata is modified to reflect migration of a file or portion of a file. The file system metadata may be stored and handled separately from other data or alternatively may be handled together with other data in a storage class 122 (typically, but not necessarily, at the highest storage class).

In one embodiment, to migrate a file or portion of a file, a range of blocks of the file may be locked while the blocks are being migrated. In one embodiment, the File System software 102 obtains a lock on the range of blocks, reads the data into system memory, writes the data out to the new storage class location, changes the mapping in the metadata, and unlocks the range of blocks. In other embodiments, ranges of blocks may be copied from one storage class location to another without being read into and written out of system memory. The range of blocks may be locked only for the time the data is being migrated. The rest of the blocks in the file remain unlocked during the migration of the range of blocks. In one embodiment, the number of blocks in a range that are locked and migrated at one time may be tuned for performance. The effects of the migration are transparent to any user of the data.

In one embodiment, to migrate a file or portion of a file, the file or portion of a file being migrated may not be locked during the transfer of the data. Instead, the data may be migrated to its new location, and the file or portion of a file may be locked only while updating the metadata. In one embodiment, an intelligent controller, array, or other mechanism may be used to migrate the data outside the host without going through system memory, without locking the file or portion of a file while the data is being transferred, and locking the file or portion of a file only while updating the metadata. In these embodiments, the file system software may need to check when it locks the file or portion of a file for the metadata update that no writes happened while the blocks were being copied. These embodiments lock the file or portion of a file for a shorter time than locking during the migration, so are less disruptive to file accesses. In one embodiment, if the file or portion of a file is being written, then a migration up for the written blocks may be performed by allocating a new set of blocks for the data being written and then directly writing them to the new disk location.

In one embodiment, a storage class 122 may be added to a multi-class file system 120 and data in files or portions of files, including application data and file system metadata, may be automatically and transparently moved to the new storage class. For example, if new, faster storage devices are available, one or more of the storage devices may be added to the multi-class file system 120 as a new, highest class of storage, and files or portions of files may be automatically migrated to the new, highest storage according to one or more policies. The same may be performed for intermediate or lowest classes of storage.

The capacity of storage classes may be increased or decreased if necessary or desired. In one embodiment, a storage class may be monitored for free space and automatically grown if necessary. In one embodiment, a storage device within a storage class may be grown to increase the capacity of the storage class. For example, a storage device with a total of 4 gigabytes of disk space may have 2 gigabytes of the disk space allocated to a storage class in a multi-class file system. If necessary or desired, free disk space on the storage device may be added to the storage class to grow the storage class. Data may be automatically and transparently moved to the newly allocated disk space on the storage device according to the policies. In one embodiment, one or more storage devices may be added to a storage class and data may be automatically and transparently moved to the new storage device according to the policies.

In one embodiment, the migration of data in a multi-class file system may be controlled by the type(s) of application data and/or file system metadata in the multi-class file system. In other words, data may be segregated in the hierarchy of storage classes according to its type. In one embodiment, file system metadata may be segregated into different storage classes based on the type of metadata and migrated between storage classes as can application data.

FIGS. 2 through 8D illustrate means for implementing a multi-class file system comprising a hierarchy of storage classes on a plurality of storage devices and means for assigning and migrating data to different storage classes in the hierarchy of storage classes according to a set of policies for the multi-class file system.

Figure 2:
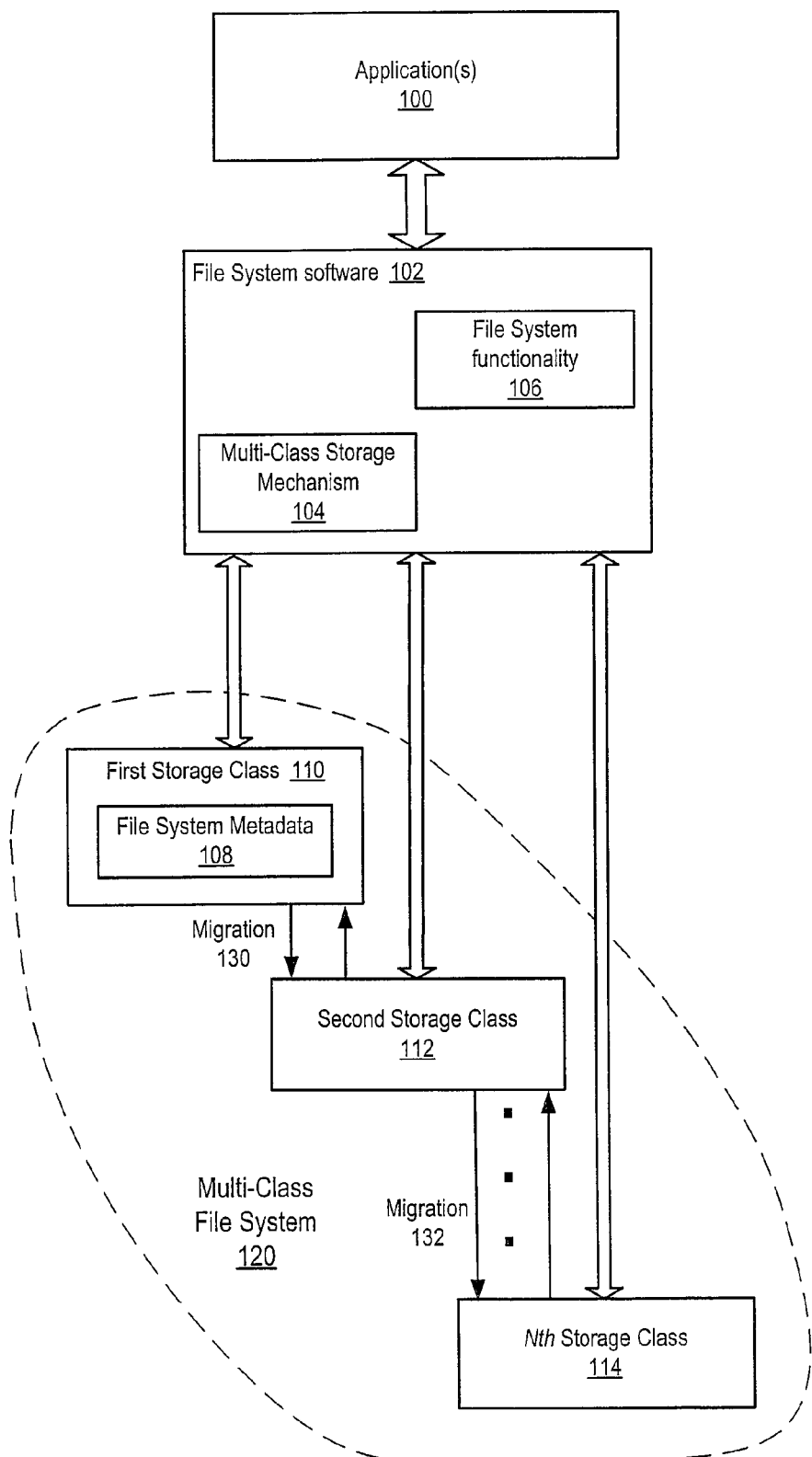
FIG. 2 illustrates file system software including a multi-class storage mechanism implementing a multi-class file system and assigning and migrating data within the file system according to one embodiment.

FIG. 2 illustrates file system software including a multi-class storage mechanism implementing a multi-class file system and assigning and migrating data within the file system according to one embodiment. File system software 102 may include, but is not limited to, an embodiment of the multi-class storage mechanism 104 and software that provides "traditional" File System functionality 106. File System functionality 106 may be provided by any of various File System implementations including, but not limited to, disk-based file systems such as Veritas' VxFS and UNIX File System (UFS), and networked file system such as Network File System (NFS) and AT&T's Remote File Share (RFS).

File system software 102 may implement, on one or more storage devices, a multi-class file system 120. In one embodiment, the software that provides the File System functionality 106 may be used to implement the multi-class file system 120, while the multi-class storage mechanism 104 manages the policies and performs assignment and migration of data within the multi-class file system 120 according to the policies. The multi-class file system 120 may include one or more physical and/or logical storage devices organized in a hierarchy of two or more storage classes according to one or more characteristics of the storage devices and/or data requirements of the user(s) of the file system. In this example, the multi-class file system 120 has N classes—a first storage class 110, a second storage class 112, and so on to an Nth storage class 114. The multi-class file system 120 is made available to the application(s) 100 as one file system. The storage class structure of the multi-class file system 120 is transparent to the application(s) 100.

In one embodiment, each storage class of the multi-class file system 120 may have different characteristics such as cost and/or geometry. In one embodiment, the storage classes may form a hierarchy, with the most expensive and typically fastest storage devices at the top, and the least expensive (and typically slower) storage devices at the bottom. The different storage classes may include heterogeneous storage devices to help achieve cost differences. For example, first storage class 110 may include one or more fast mirrored storage devices, second storage class 112 may include one or more RAID-5 storage devices, and a lowest storage class may include one or more read/write optical storage devices. In one embodiment, the amount of total storage at each storage class in the hierarchy may increase at each lower storage class of the hierarchy, though this is not required.

Note that, in some implementations, other criteria than cost and performance may be used to organize the storage devices into a hierarchy of storage classes. For example, storage capacity may be used as a criterion to select storage devices for a lower storage class. As another example, ownership or usage of the storage devices may be used as a criterion to place storage devices in storage classes. In this example, a storage device may be placed in a storage class based on the department or application that uses the storage device rather than on cost or performance characteristics of the storage device, and the policies may be implemented such that data belonging to that department or application is assigned to that storage device.

Multi-class storage mechanism 104 may store files, or portions of files, in storage classes of the multi-class file system 120 according to one or more user-defined policies geared to the business needs of the enterprise. Multi-class storage mechanism 104 may also migrate files and/or portions of files between storage classes in the multi-class file system 120 according to one or more user-defined policies. For example, as indicated at 130, files and/or portions of files may be migrated from first storage class 110 to second storage class 112, or from second storage class 112 to first storage class 110, according to the policies. As indicated at 132, files and/or portions of file may be migrated from second storage class 112 to lower storage classes in the multi-class file system 120 (e.g. the Nth storage class 114). The policies may be configured to move data up or down in the hierarchy of storage classes. In one embodiment, when data is reclassified to a lower or lowest storage class, the data may be compressed to further lower the cost of storage. Note that migrated files and/or portions of files remain in the same file system and are not migrated offline when migrated to any of the storage classes, even the lowest storage class. Also note that migration is performed transparently to the application(s) 100.

While FIG. 2 shows data migrating down from a higher storage class down to a next lower storage class, and data migrating up from a lower storage class to a next higher storage class, note that data may be migrated from any storage class to any other storage class in the hierarchy of storage classes according to the policies. For example, when migrating data down in the hierarchy of storage classes, some data may be migrated from the highest storage class to the next lower storage class, and other data may be migrated directly to the lowest storage class according to the policies. Similarly, when migrating data up in the hierarchy of storage classes, some data may be migrated from the lowest storage class to the next higher storage class, and other data may be migrated directly to the highest storage class according to the policies.

In one embodiment, the multi-class storage mechanism 104 may store new files in the multi-class file system at the highest or higher storage classes of the hierarchy. In one embodiment, as data ages (data including files and portions of files, e.g. a set of records in a database), the data may be moved down the hierarchy to lower-cost storage on lower storage classes to reduce the cost of storing the data. In one embodiment, data may be written into fast storage (e.g. fast mirrored storage) and then batched to slower storage such as RAID-5 storage, for example on a nightly schedule. Note that business-related attributes of the data such as importance, value, or ownership may be considered in decisions to assign and/or migrate the data. For example, a user may define the policies so that a file or portion of a file considered critical to business operations, and thus requiring fastest possible access times, may be kept in a highest storage class although access information may indicate that the file or portion of the file be migrated to a lower storage class. As another example, a user may define the policies so that a file or files, or portions of files, belonging to a certain group within the business may be kept in a higher storage class although access information may indicate that the file(s) or portions of file(s) be migrated to a lower storage class.

In one embodiment, when multi-class storage mechanism 104 migrates a file or portion of a file down to a lower storage class or up to a higher storage class in the multi-class file system, file system metadata 108 (e.g., inode information) is modified to reflect the move because the file or portion of a file is being moved to a different storage device. Note that file path information exposed to the application(s) 100 is not modified; the move is transparent to the application(s) 100. Also note that the moved data remains "on-line" in the multi-class file system 120, even when moved to the lowest storage class. The data is not moved "offline" and replaced by a stub (e.g. as in HSMs). Thus, the metadata (e.g., inode of the file) is modified to indicate the new location (e.g. device:block number(s) or device:extent(s)) of the data. If an application 100 requests the data, the data is still on-line in the file system, so it can be accessed directly without having to restore the data from offline storage. Thus, the structure of the multi-class file system 120 is transparent to application(s) 100 accessing the data stored in the multi-class file system 120.

Regardless of where a file, block, or extent is stored in the multi-class file system 120, the file appears the same to the application(s) 100.

In one embodiment, the policies may be implemented to consider business criteria (e.g. value) and/or usage patterns of the data in making assignment and migration decisions. In one embodiment, the policies for classifying and migrating data in the hierarchy may be tailored to business needs to lower the total cost of the storage farm without compromising on performance or availability. There are many possible combinations of data usage and business criteria that may be implemented in the policies for use by the multi-class storage mechanism 104 in classifying data as to its initial storage class in multi-class file system 120 and in reclassifying and migrating data down to a lower storage class or up to a higher storage class in multi-class file system 120. The policies may make decisions according to the application, user, and/or business segment (e.g., department, division, etc) accessing or associated with the data, access patterns for the data, a specified policy (e.g. files in a particular directory or of a particular business group or employee could be assigned to high, medium, or low access classes), and/or any other desired parameter or parameters.

In one embodiment, multi-class storage mechanism 104 may track access of data, including application data and file system metadata, in files or portions of files, automatically downgrade at least a portion of the data on a storage class (e.g. at a time interval specified by a user or administrator) that has not been accessed for a given time interval, and migrate the downgraded data, in files or portions of files, to a lower storage class. In one embodiment, multi-class storage mechanism 104 may also be configured to migrate data on a storage class that has been accessed to a higher storage class. In one embodiment, a policy or policies may be operationally driven (e.g. to migrate data up to a higher class to do end-of-period processing, then back down when the processing is done).

One embodiment may break files down into smaller ranges of blocks or extents and keep statistics on the ranges (access times, usage characteristics, etc) to help make policy-based automatic decisions. The ranges of the files may then be separated on different classes according to the statistics as determined by the policies. For example, databases may have large files with high-priority and low-priority records mixed in. The files may be broken down into ranges that include high-priority or low-priority records, and statistics may be kept on the individual ranges. As another example, DB2 databases may have partitioned data based on certain indexes or fields in the database. Combinations of partitions may be created, and the DB2 database may be partitioned among classes of storage. This may be used, for example, in scaling clustering solutions.

Figure 3:
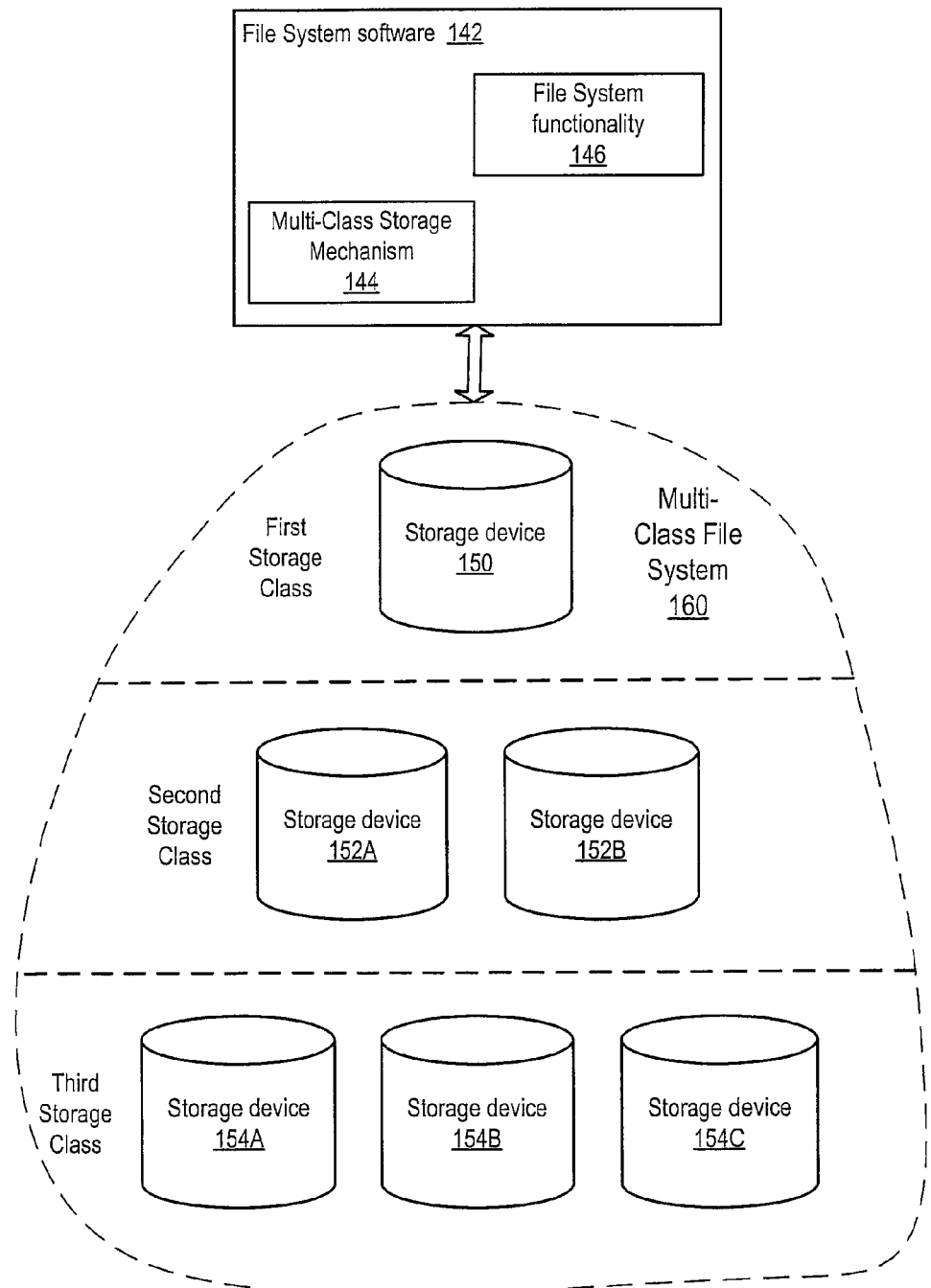
FIG. 3 illustrates a multi-class file system based on a multi-device feature of File System software according to one embodiment.

In one embodiment, the partitioning technique used to implement a multi-class file system may be a multi-device feature of a File System (represented as File System functionality 106 in FIG. 2). FIG. 3 illustrates a multi-class file system based on a multi-device feature of File System software according to one embodiment. File system software 142 may include, but is not limited to, an embodiment of the multi-class storage mechanism 144 and software that provides "traditional" File System functionality 146. File System functionality 146 may be provided by any of various File System implementations including, but not limited to, disk-based file systems such as Veritas' VxFS and UNIX File System (UFS), and networked file system such as Network File System (NFS) and AT&T's Remote File Share (RFS).

Each storage device in the multi-class file system 160 may be a logical or physical storage device. Typically, a physical device will be assigned to a particular class, but it is possible that two or more logical devices on one physical device may be allocated to different storage classes. The storage devices may be segmented into N storage classes in the multi-class file system 160 (in this example, three storage classes) by File System functionality 146. In this example, the first storage class includes storage device 150, the second storage class includes storage devices 152A and 152B, and the third storage class includes storage devices 154A, 154B, and 154C. Note that a storage class may include any number of individual storage devices.

The storage devices may be divided into storage classes by File System functionality 146 according to characteristics of the storage devices. In one embodiment, the storage classes may be arranged from a first storage class of highest-performing (and typically most expensive) storage devices, to a lowest storage class of poorest-performing (and typically least expensive) storage devices. There may be more storage devices per storage class in lower storage classes than in higher storage classes, but this is not required. The storage devices may be heterogeneous; that is, there may be different vendors and/or models of storage devices in the different storage classes, and there may be different vendors or models of storage devices within a storage class. In other words, storage devices may be grouped in a storage class and/or divided into different storage classes according to performance characteristics rather than make and model.

In one embodiment of the multi-device implementation, the file system software 142 may address each device as a range of blocks (e.g. from 0-n). In one embodiment, the multi-class file system may address a particular block in the file system as a device:block number, or alternatively device:extent, if extents are used. The device:block number may be associated with a path or directory in the file system metadata. The multi-class storage mechanism 144 tracks which storage devices are assigned to which storage classes. If the multi-class file system 144 moves a file or portion of a file to another storage device on another storage class, the file or portion of a file remains active in the file system, and the metadata is modified to reflect the move. The device:block number is changed, but the path or directory information remains the same. Thus, the move is transparent to an application that accesses the file.

A multi-class file system 160 based on a multi-device feature of a File System may be expanded. For example, storage devices may be added to the storage classes and/or additional storage classes may be added using the File System functionality 146, and the multi-class storage mechanism 144 may store or migrate files or portions of files to the new storage device(s) and/or storage class(es) automatically and transparently to the application(s) that access the multi-class file system 160. As another example, storage allocated to a storage class on a storage device within the storage class may be expanded to increase the size of the storage class.

Figure 4:
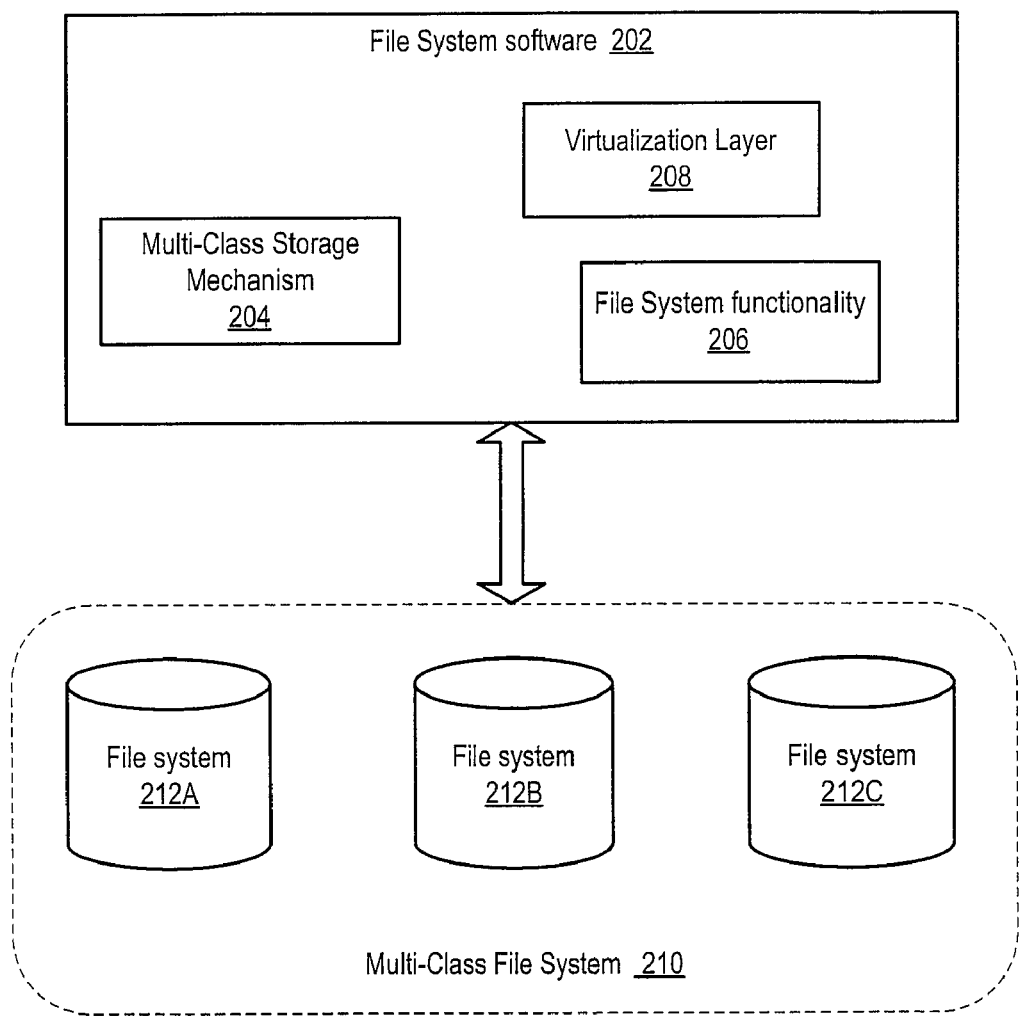
FIG. 4 illustrates a multi-class file system based on multiple independent file systems under a virtualization layer according to one embodiment.

In another embodiment, the partitioning technique used to implement a multi-class file system may be multiple independent file systems under a virtualization layer, as illustrated in FIG. 4. File system software 142 may include, but is not limited to, an embodiment of the multi-class storage mechanism 204, software that provides "traditional" File System functionality 206, and a virtualization layer 208. File System functionality 206 may be provided by any of various File System implementations including, but not limited to, disk-based file systems such as Veritas' VxFS and UNIX File System (UFS), and networked file system such as Network File System (NFS) and AT&T's Remote File Share (RFS).

File System functionality 206 may implement a plurality of separate file systems (e.g., file systems 212A, 212B, and 212C). Each file system 212 may be implemented to represent a class in a multi-class file system 210. For example, file system 212A may be a highest storage class, file system 212B may be a middle storage class, and file system 212C may be a lowest storage class. Each file system 212 may be implemented on a separate storage device, or alternatively one or more of the file systems 212 may logically extend across two or more storage devices. Each file system 212 may have its own file system metadata. Virtualization layer 208 may be used to map these file systems 212 to a single file system and present the single file system to one or more application(s). Virtualization layer 208 maintains some form of metadata for the single file system that maps data paths as used by application(s) to data locations in the file systems 212.

Multi-class storage mechanism 204 maintains and implements the user-defined policies of the multi-class file system 210. Multi-class file system 210 may initially assign files or portions of files to storage classes (i.e., file systems) based on the policies, and may monitor file usage and migrate files or portions of files up or down in the storage classes according to the policies (in this example, the three storage classes represented by file system 212A, file system 212B, and file system 212C). To assign or migrate a file or a portion of a file, multi-class file system 210 may interact with File System functionality 206 to actually move the file from one file system 212 to another (including modifying the metadata on the affected file systems 212), and with virtualization layer 208 to modify the metadata for the single file system presented to the application(s) to reflect the move. Alternatively, File System functionality 206 may interact with virtualization layer 208 to modify the metadata for the single file system presented to the application(s) to reflect the move. In the metadata for the single file system presented to the application(s), the path information is not modified when a file or portion of a file is migrated. Further, the file or portion of a file remains within the single file system presented to the applications(s) by the virtualization layer 208, and within the file systems 212, and is not moved offline. Thus, the multi-class file system 210, and migration of data within the multi-class file system 210, remains transparent to the application(s). All the application(s) see, or need to see, is the single file system presented by the virtualization layer 208.

In yet another embodiment, the partitioning technique used to implement a multi-class file system may be block ranges with different characteristics. The block ranges may be implemented by either the software that provides file system functionality (e.g., Veritas' VxFS) or in the underlying volume manager or disk subsystem(s). In this embodiment, sets of characteristics may be assigned to different ranges of blocks. In the multi-device implementation, the file system software may address each device as a block range (e.g. from 0-n), and addresses one particular block in the file system as device:block number. In the block range implementation, the device may be made the high-order bits of the block number, and the concatenated block numbers, separated into ranges representing storage classes, may be used to implement the multi-class file system. Thus, a block range may extend across one or more devices. In this implementation, one virtual device may be presented to the application with distinctly different characteristics associated with block ranges of the virtual device, with the file system software understanding what block ranges of the file system have those characteristics.

The multi-class storage mechanism maintains and implements the user-defined policies of a multi-class file system implemented by moving block ranges between storage classes. The multi-class file system may initially assign files or portions of files to storage classes (block ranges) based on the policies, and may monitor file usage and migrate files or portions of files up or down in the storage classes according to the policies. To assign or migrate a file or a portion of a file, the multi-class file system may interact with the software that provides File System functionality to actually move the file from one block range to another (including modifying the metadata to reflect the move). In the metadata, the path information is not modified when a file or portion of a file is migrated. Further, the file or portion of a file remains within the file system presented to the applications(s), and is not moved offline. Thus, the multi-class file system, and migration of data within the multi-class file system, remains transparent to the application(s).

Note that other techniques to partition storage devices into storage classes than those described herein may be used in other embodiments. Embodiments of the multi-class storage mechanism may function transparently to the particular underlying partitioning technique used to organize storage devices or file systems into a multi-class file system.

Figure 5:
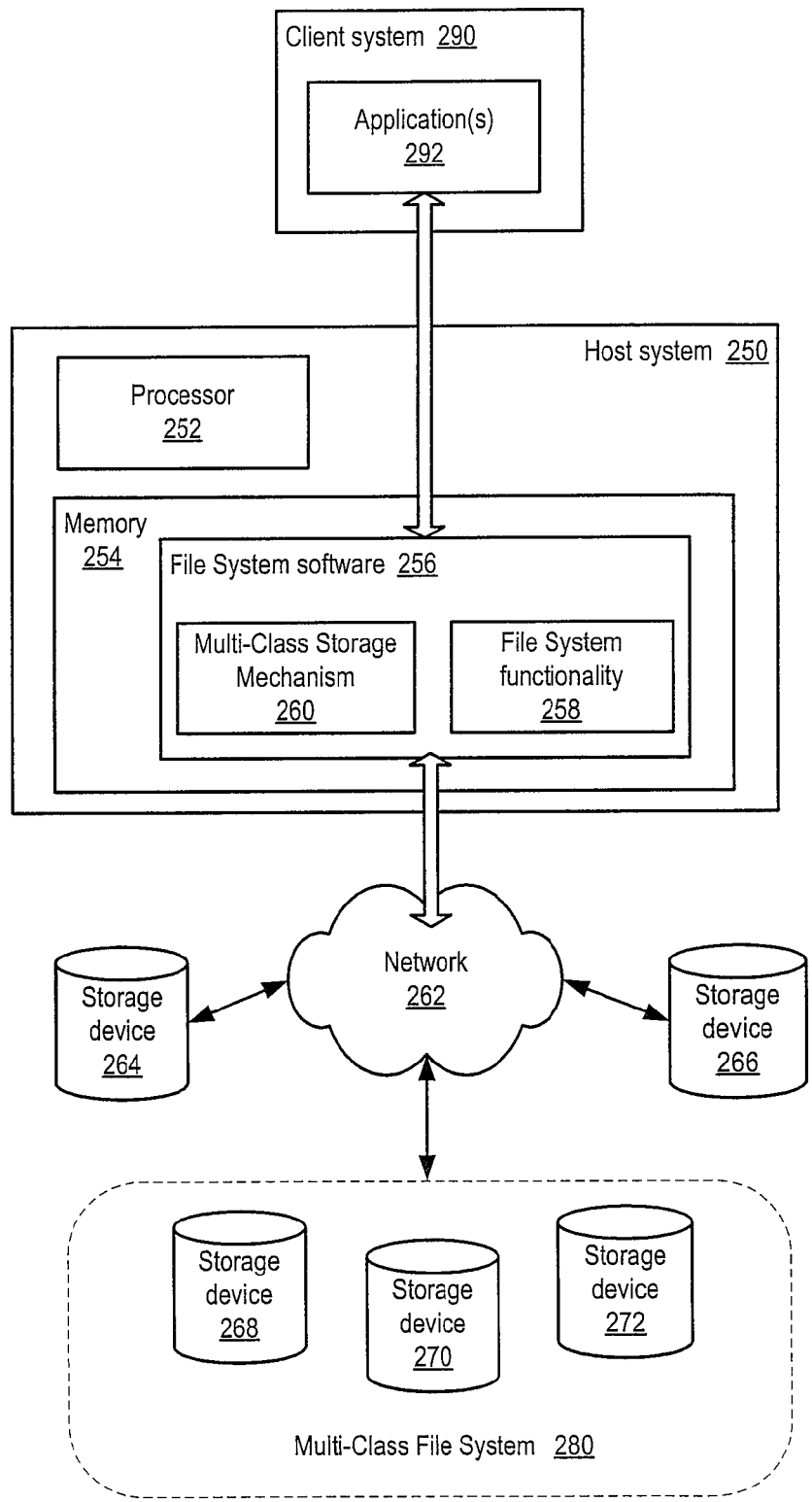
FIG. 5 illustrates a multi-class file system in a network storage environment according to one embodiment.

FIG. 5 illustrates a multi-class file system in a network storage environment according to one embodiment. Host system 250 may be any of various types of devices, including, but not limited to, a personal computer system, desktop computer, laptop or notebook computer, mainframe computer system, workstation, network computer, or other suitable device. Host system 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Host system 250 may couple, for example over a wired or wireless network or networks, to one or more other devices, e.g. client system 290, via one or more wired or wireless network interfaces. Host system 250 may couple over a network 262 to two or more storage devices, in this example storage devices 264, 266, 268, 270 and 272. Network 262 may, for example, be a Storage Area Network (SAN), a LAN with Network-Attached Storage (NAS), or any network capable of coupling storage devices to a host system 250. The storage devices may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller), tape devices, and optical storage devices.

Host system 250 may include, in memory 254, file system software 256. File system software 256 may include, but is not limited to, an embodiment of the multi-class storage mechanism 260 and software that provides "traditional" File System functionality 258. File System functionality 258 may be provided by any of various File System implementations including, but not limited to, disk-based file systems such as Veritas' VxFS and UNIX File System (UFS), and networked file system such as Network File System (NFS) and AT&T's Remote File Share (RFS). In one embodiment, file system software 256 may also include a virtualization layer (not shown) that may be used to map file systems on the storage devices to a single file system and to present the single file system to one or more application(s).

File System functionality 258 of file system software 256 may implement, on one or more of the storage devices, a multi-class file system 280 (in this example, on storage devices 268, 270, and 272). One of the methods for implementing a multi-class file system previously described may be used. In one embodiment, the software that provides the File System functionality 258 may be used to implement the multi-class file system 280, while the multi-class storage mechanism 260 manages the policies and directs assignment and migration of data within the multi-class file system 280 according to the user-defined policies.

The multi-class file system 280 may include one or more physical and/or logical storage devices organized in a hierarchy of two or more storage classes according to one or more characteristics of the storage devices and/or data requirements of the user(s) of the file system. For example, the multi-class file system 280 may have three classes—a first storage class on storage device 268, a second storage class on storage device 270, and a third storage class on storage device 272. As another example, storage device 268 may be a first storage class, and storage devices 270 and 272 may both be included in a second storage class. The multi-class file system 280 is made available to the application(s) 292 on client system 290 as one file system. The structure of the multi-class file system, and assignment and migration of data within the multi-class file system, are transparent to the application(s) 292.

In one embodiment, each storage class of the multi-class file system 280 may have different characteristics such as cost and/or geometry. In one embodiment, the storage classes may form a hierarchy, with the most expensive and typically fastest storage devices in the top or first storage class, and the least expensive (and typically slower) storage devices in the bottom or last storage class.

Figure 6:
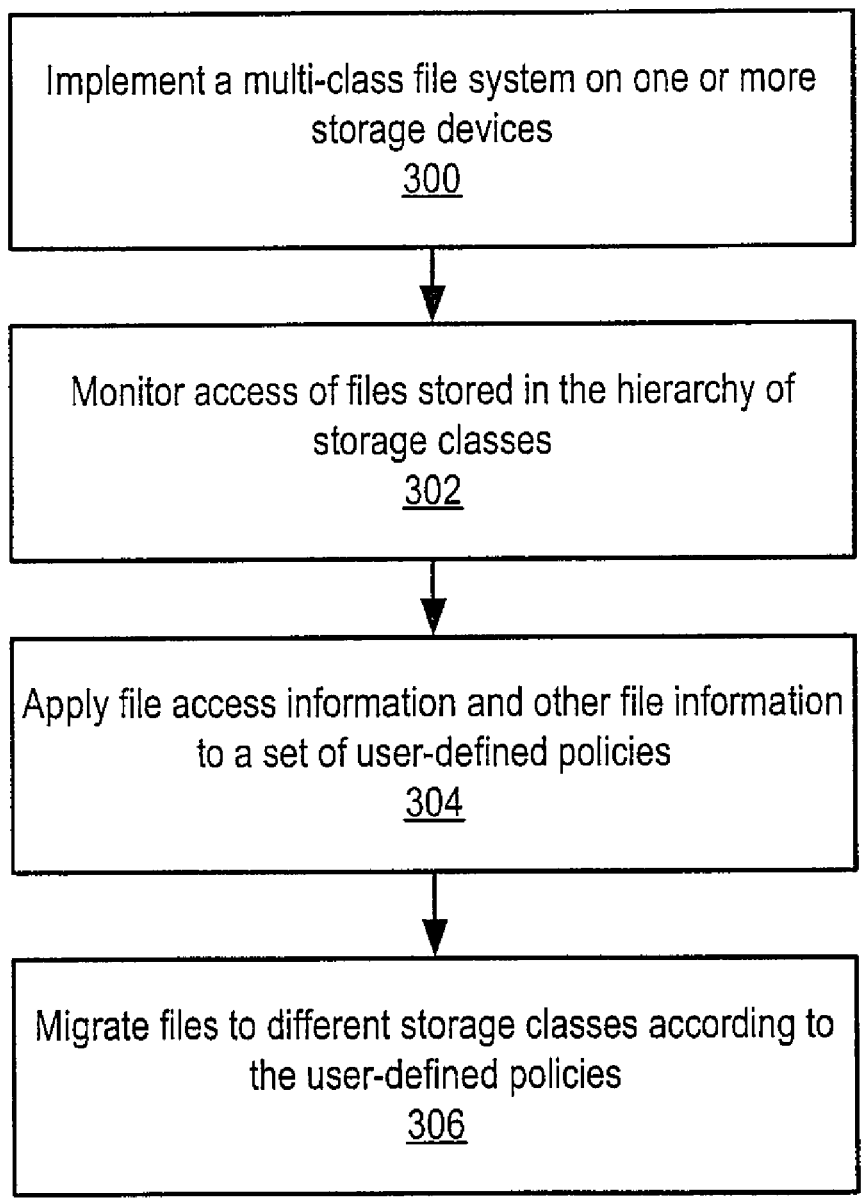
FIG. 6 is a flowchart of a method for assigning and migrating files or portions of files in a multi-class file system according to one embodiment.

FIG. 6 is a flowchart of a method for assigning and migrating files or portions of files in a multi-class file system according to one embodiment. As indicated at 300, a multi-class file system including a hierarchy of storage classes may be implemented on one or more storage devices. In one embodiment, a multi-device feature of file system software (e.g. Veritas' VxFS) may be used to implement the multi-class file system. Different architectures for the underlying structure of the multi-class file system were previously described. In one embodiment, each storage class includes one or more storage devices assigned to the storage class according to one or more characteristics of the storage class, e.g. performance characteristics. In one embodiment, the storage classes may be ordered in the hierarchy of storage classes according to performance characteristics from a highest storage class including one or more high-performance storage devices to a lowest storage class comprising one or more low-performance storage devices.

In one embodiment, a multi-class storage mechanism of the file system software may initially place files in the storage classes in the hierarchy of storage classes according to a user-defined policy for assigning new files to an initial storage class in the hierarchy of storage classes.

As indicated at 302, the multi-class storage mechanism of the file system software may monitor access of files stored in the hierarchy of storage classes to generate access information for the files. As indicated at 304, the multi-class storage mechanism software may apply the access information and other information about the file (e.g. ownership of the file, business value or importance of the file, etc.) to a set of user-defined policies for initially assigning and migrating files in the hierarchy of storage classes.

As indicated at 306, the multi-class storage mechanism of the file system software may migrate one or more of the files to different storage classes in the hierarchy of storage classes according to the set of user-defined policies when applied to the access or other file information. In one embodiment, less-frequently-accessed files may be migrated to lower storage classes including lower-performing storage devices, and more-frequently-accessed files may be migrated to higher storage classes including higher-performing storage devices. In one embodiment, files migrated to one or more storage classes in the hierarchy of storage classes, for example to the lowest class, may be compressed. In one embodiment, the multi-class storage mechanism software may modify file system metadata when a file is assigned or migrated to indicate the storage class for the file. In embodiments, migrating files to different storage classes may be performed transparently to an application that accesses the files in the hierarchy of storage classes. Note that files migrated to a lowest storage class remain online in the file system, i.e. the data is still present in the file system and is not moved offline.

In one embodiment, the multi-class storage mechanism software may assign or migrate a portion of a file (e.g. a range of blocks or sectors) to one storage class in the hierarchy of storage classes while assigning or leaving the remainder of the file on a different storage class according to the user-defined policies for assigning or migrating files.

In one embodiment, a new storage class may be added to the hierarchy of storage classes, and the multi-class storage mechanism software may transparently migrate one or more of the files or portions of the files from one or more others of the storage classes to the new storage class according to the policies. Storage classes may be increased or decreased in capacity if necessary or desired. In one embodiment, one or more storage devices may be added to a storage class and data may be automatically and transparently moved to the new storage device according to the policies. In one embodiment, a storage device within a storage class may be grown to increase the capacity of the storage class. If necessary or desired, free disk space on a storage device may be added to the storage class to grow the storage class. Data may be automatically and transparently moved to the newly allocated disk space on the storage device according to the policies.

FIGS. 7A through 7E illustrate the migration process in an exemplary multi-class file system with three storage classes according to one embodiment. In this example, file system software may include a multi-class storage mechanism as previously described. The file system software may, as previously described, implement a multi-class file system 240 including a hierarchy of storage classes on one or more storage devices; in this example there are three storage classes 220, 222, and 224, each of which may include one or more storage devices. Note that other multi-class file systems may have different numbers of storage classes. Also note that the term "data" as used in this example indicates a file or a portion of a file (e.g., a range of blocks or one or more extents).

The multi-class storage mechanism may maintain a set of policies for data assignment and migration within the multi-class file system, may monitor data accesses within the multi-class file system, and may cause data being monitored to be assigned to storage classes and/or migrated to different storage classes within the multi-class file system according to the set of policies. In this example, first storage class 220 may be mirrored on one or more high speed disks, and actively written data may be assigned or migrated there according to the policies. Data that have not been written to for some period (e.g. in the last month) are migrated to the second storage class 222 according to the policies, and data that have not been written to for some period (e.g. in the last quarter) are migrated to the third storage class 224 according to the policies. The second storage class 222 and third storage class 224 may each include one or more storage devices, which may be less expensive and slower than the storage device(s) of the first storage class (e.g. RAID-5 array(s)); the third storage class 224 may include one or more less expensive, and slower, storage devices than the storage device(s) of the second storage class 222. If data in the second storage class 222 or third storage class 224 is written to, it may be migrated back to the first storage class 220 according to the policies.

FIGS. 8A through 8D illustrate an exemplary metadata structure for data 230 of FIGS. 7A-7D that may be modified by the file system software during assignment and migration of data 230 in multi-class file system 240 according to one embodiment. As the migration process is described using FIGS. 7A-7E, FIGS. 8A-8D will be referenced to indicate modifications in the metadata to reflect the migration(s).

Figure 7A:
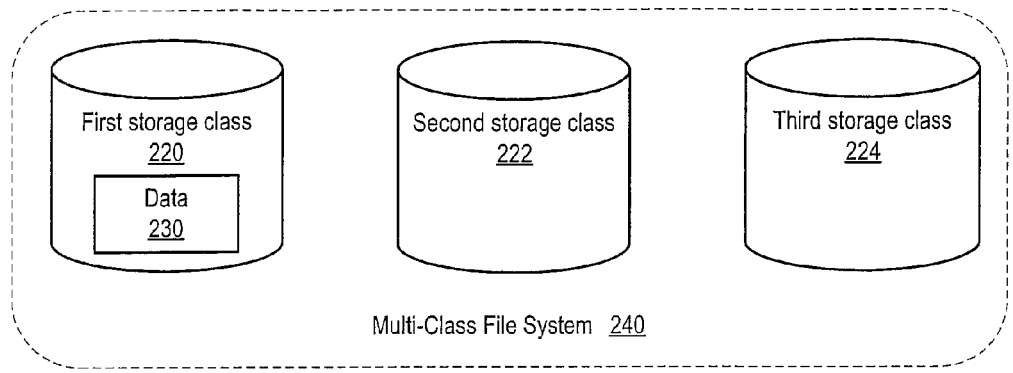
FIGS. 7A through 7E illustrate the migration process in an exemplary multi-class file system with three storage classes according to one embodiment.

As illustrated in FIG. 7A, data 230 may initially be written to first storage class 220 of multi-class file system 240. Data 230 may be a file or a portion of a file (e.g. one or more records of a database file, a range of blocks, or one or more extents of a file). The data may have been generated by some application using the multi-class file system 240. From the application's perspective, the data 230 was created at some logical location in the file system as seen by the application indicated to the application by a path. For example, a path to data 230 may look something like "/MyDrive/MyFolder/MyFile" Note that this example is exemplary and is not intended to be limiting; other methods for indicating a path to data in a file system are possible.

FIG. 8A illustrates metadata for data 230 when assigned to first storage class 220. When data 230 is assigned to the first storage class 220, the data 230 is written to a block range on a storage device in the first storage class 220. In this illustration, the path as seen by the application is shown on the left, and the location information for the data 230 in the multi-class file system 240 as used by the file system software is shown on the right. The location information for the data 230 in the multi-class file system 240 indicates that the data 230 is located at "First Storage Class:Device:Block Number". Note that this example is exemplary and is not intended to be limiting; other methods for storing location information for data in a multi-class file system are possible. For example, an alternative is to simply indicate the device and block number, as the storage class may be determined from the device identifier. Another alternative is to concatenate the device identifier and block number (as is done in embodiments where the underlying implementation of the multi-class file system uses block ranges as storage classes, as previously described). Also note that the metadata may include other information not shown, such as the number of blocks the data 230 occupies starting at the indicated block number.

Figure 7B:
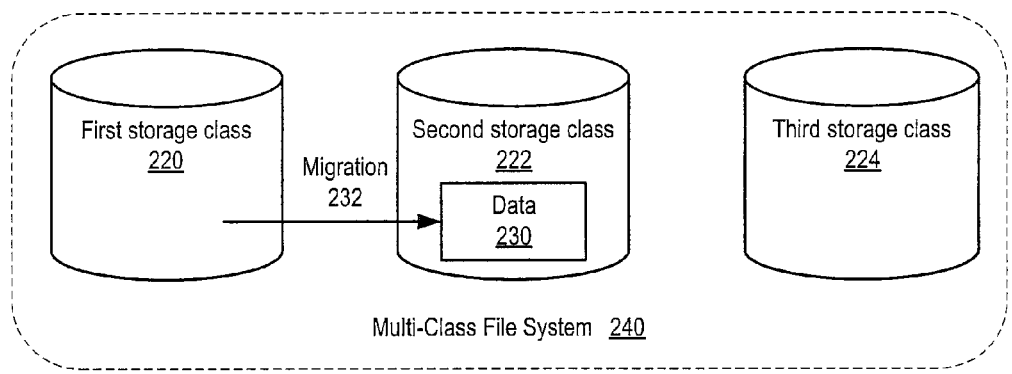

As illustrated in FIG. 7B, at some point migration 232 of data 230 from first storage class 220 to second storage class 222 may occur. For example, the multi-class storage mechanism may monitor (read and/or write) access of data on first storage class 220, and periodically migrate data that has not been accessed for a period of time (e.g. one month) to second storage class 222 according to the policies. In this example, after data 230 is initially assigned to first storage class 220, the multi-class storage mechanism may monitor access of data 230 and, if the data has not been accessed for a period of time as specified by the policies, may migrate data 230 to second storage class 222. The migration 232 does not move data 230 offline; data 230 remains online within the file system. Note that the policies may include other criteria than simply access criteria to determine when and if data is to be migrated. For example, the policy may indicate that data 230 is critical to business operations, or is owned by a particular user or application, and is therefore not to be migrated. As another example, the policy may specify that all actively accessed data is to be stored on first storage class 220 and migrated to second storage class 222 after a month of inactivity except data that belongs to a particular non-critical application, which is to be migrated to second storage class 222 after one week of inactivity. Using the policies, other criteria, including business-related criteria, than simply data access criteria may be applied by the multi-class storage mechanism in making assignment and migration decisions.

FIG. 8B illustrates the metadata for data 230 after migration 232 to second storage class 222. Note that the location information for the data 230 in the multi-class file system 240 used by the file system software now indicates that data 230 is stored starting at a block number on a device of the second storage class 222. Also note that the path as seen by the application has not changed; from the application's perspective, migration 232 is transparent. The migration 232 does not move data 230 offline; data 230 remains online within the file system.

Figure 7C:
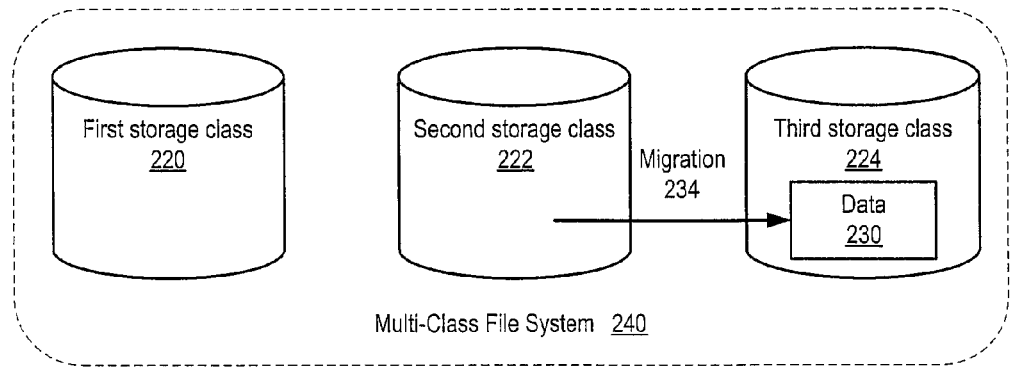

As illustrated in FIG. 7C, at some point migration 234 of data 230 from second storage class 222 to the third storage class 224 may occur. For example, the multi-class storage mechanism may monitor (read and/or write) access of data on the second storage class 222, and periodically migrate data that has not been accessed for a period of time (e.g. three months) to third storage class 224 according to the policies. In this example, after data 230 has migrated to second storage class 222, the multi-class storage mechanism may monitor access of data 230 and, if the data has not been accessed for a period of time as specified by the policies, may migrate data 230 to third storage class 224. The migration 234 does not move data 230 offline; data 230 remains online within the file system. Note that the policies may include other criteria than simply access criteria to determine when and if data is to be migrated. Using the policies, other criteria, including business-related criteria, than simply data access criteria may be applied by the multi-class storage mechanism in making assignment and migration decisions.

FIG. 8C illustrates the metadata for data 230 after migration 234 to third storage class 224. Note that the location information for the data 230 in the multi-class file system 240 used by the file system software now indicates that data 230 is stored starting at a block number on a device of the third storage class 224. Also note that the path as seen by the application has not changed; from the application's perspective, migration 234 is transparent. The migration 234 does not move data 230 offline; data 230 remains online within the file system.

While FIGS. 7A-7C show data migrating from a higher storage class down to a next lower storage class, note that data may be migrated from any storage class to any other storage class in the hierarchy of storage classes according to the policies. For example, when migrating data down in the hierarchy of storage classes, some data may be migrated from the highest storage class to the next lower storage class, and other data may be migrated directly to the lowest storage class according to the policies.

Figure 7D:
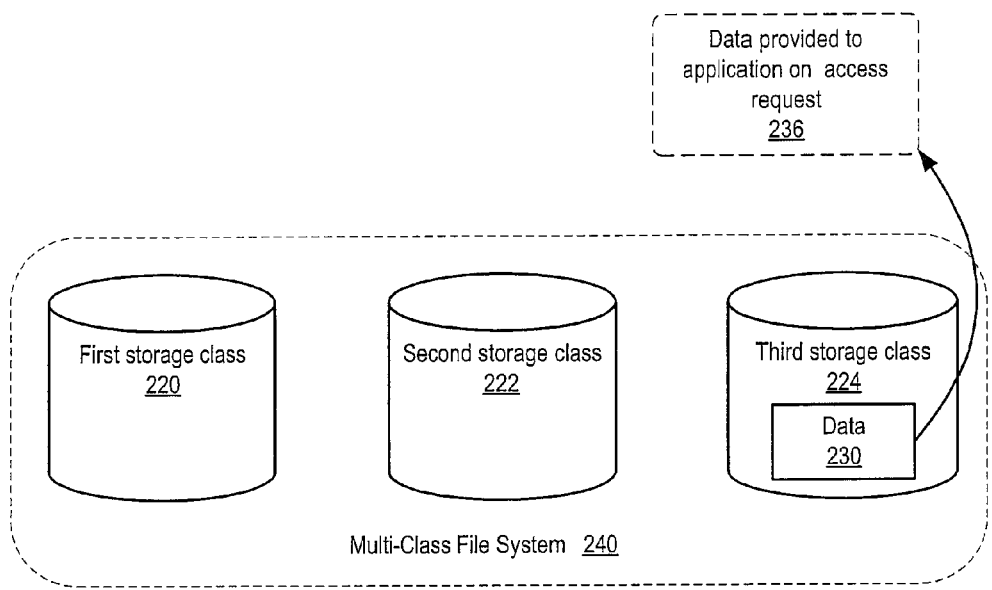
Figure 7E:
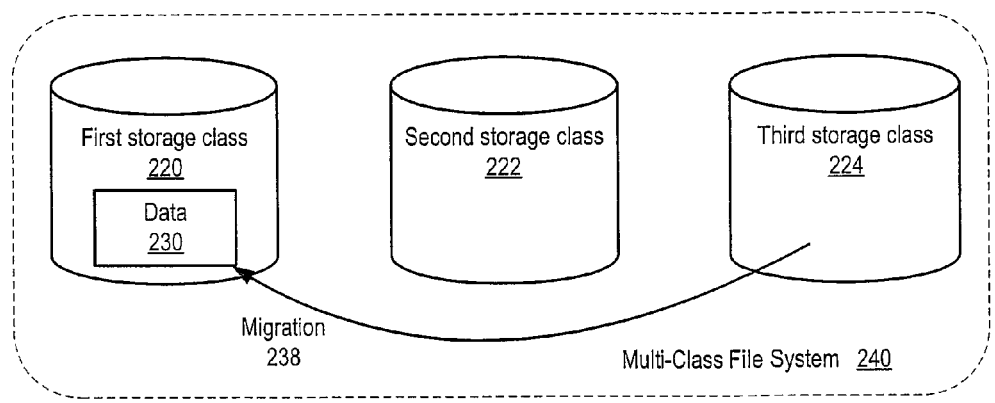

FIGS. 7D and 7E illustrate an exemplary method of handling of an access of data 230 on third storage class 224 according to one embodiment. At some point after migration 234 of data 230 to third storage class 224, an application may generate an access request (e.g. a read or write request) for the data 230. In FIG. 7D, the file system software may provide data 230 to the application to satisfy the access request, as indicated at 236. The policies may indicate to the multi-class storage mechanism that data stored on third storage class 224 is to be migrated to first storage class 220 if the data is accessed. In FIG. 7E, the multi-class storage mechanism may migrate 238 data 230 from third storage class 224 to first storage class 220 in response to the access of data 230 by the application if so indicated by the policies. The migration 238 does not have to restore data 230 from offline storage back into the file system; data 230 was online within the file system prior to the migration 238.

Note that, alternatively, data 230 may be migrated 238 to first storage class 220 prior to providing the data 230 to the application as indicated at 236. Also note that the policies used by the multi-class storage mechanism to make migration decisions may indicate some other action, which may be determined using other criteria than simply data access criteria, than migration to first storage class 220 upon access of data 230 is to be performed. For example, the policies may indicate that, if the access is a write access, data 230 is to be migrated to first storage class 220, but if the access is a read access, data 230 is to remain on third storage class 224. As another example, the policies may indicate that an access of data 230 by a particular application (or user) does not require data 230 to be migrated, but access by another application (or user) does require data 230 to be migrated.

While FIGS. 7D and 7E show data migrating up from a lowest storage class to a the highest storage class, note that data may be migrated from any storage class to any other storage class in the hierarchy of storage classes according to the policies. For example, when migrating data up in the hierarchy of storage classes, some data may be migrated from the lowest storage class to the next higher storage class, and other data may be migrated directly to the highest storage class according to the policies.

FIG. 8D illustrates the metadata for data 230 after migration 238 to first storage class 220 from third storage class 224. Note that the location information for the data 230 in the multi-class file system 240 used by the file system software now indicates that data 230 is stored starting at a block number on a device of the first storage class 220. Note that the device is not necessarily the same device as in the metadata of FIG. 8A, and the block number is not necessarily the same block number as in the metadata of FIG. 8A. Also note that the path as seen by the application has not changed; from the application's perspective, migration 238 is transparent.

One embodiment may include one or more storage classes of writeable storage and one or more storage classes that are not writeable (read-only). Note that, in one embodiment, storage devices within a storage class may be segmented into subclasses of writeable and read-only storage devices. Files may be migrated down to a read-only storage class, but the read-only storage class is only written to during migration. Thus, there may be one or more read-only storage classes in a multi-class file system. To write to one of the files in a read-only storage class, the file may first be migrated up to a writeable storage class to be written to. The file may remain in the higher storage class for a period until the multi-class storage mechanism determines that the file may be migrated back to the read-only storage class, or alternatively may be immediately migrated back to the read-only storage class, according to the policies.

In one embodiment, it may not be necessary to migrate an entire file because the file mapping in the file system may be implemented so that the blocks or sectors of the file that have not been modified may remain on a read-only storage class and the blocks or sectors that are to be modified are migrated to a writeable storage class according to the policies. Thus, parts of files as well as entire files may be migrated, and different blocks or sectors of a file may concurrently reside on different storage classes. To write to a file on a read-only storage class, blocks, sectors or records (in a database) that need to be modified may be migrated to a writeable storage class while the rest of the file stays on the read-only storage class.

The ability to migrate a portion of a file may be an important feature for databases, as an example. Once completed, a transaction in a database is typically not modified again. All transactions that have not been completed yet may reside in a writeable storage class. Periodically, completed transactions may be migrated to a read-only storage class (the database application may still need to access the transactions, so keeping them available is preferable). Inactive or completed records in a database may be migrated down to a read-only storage class while records that are still active are maintained in a writeable storage class according to the policies.

In one embodiment, a multi-class file system may include one or more levels of general storage classes, with one or more storage classes in each general storage class. A general storage class, like a storage class, may be based, for example, on cost/performance characteristics of the storage devices. Two or more storage classes in a general storage class may be considered at the same level in the hierarchy of storage classes. Data may be stored on or migrated to different classes of storage within a more general storage class according to the policies. For example, a general read-only storage class may include a storage class for actively accessed read-only data and a storage class for non- (or rarely-) accessed read-only data, the latter of which may be compressed. As another example, a general writeable storage class may include two or more classes based on criteria such as frequency of access. Note that other criteria than frequency of access may be applied to segment data within storage classes in a general storage class. As an example, importance of the data may be used as a criterion; some data within a general storage class may be deemed more important or critical than other data, and thus may be segmented from the less important data by storing the different data on different storage classes within the general storage class.

Using Compression in a Multi-Class File System

Embodiments may use compression to achieve further data storage efficiency in a multi-class file system. In a multi-class file system, there may be one or more classes of storage that contain files or blocks that are not actively written. By compressing these files (or blocks), a significant amount of disk space may be saved. One embodiment may compress all files or ranges of blocks migrated to a lower or lowest storage class. Rather than compressing all the files or blocks in a storage class, another embodiment may gather usage statistics for files or blocks in a storage class or storage classes and compress files (or, alternatively, ranges of blocks) in the storage class that are less frequently accessed.

Since it is known that the files or block ranges to be compressed are not being actively written, the file system may choose a compression algorithm that provides better space savings at the expense of not being able to do efficient in-place updates. In one embodiment, data in older (lower) storage classes may be compressed.

One embodiment may keep statistics on file usage and compress less-used (below some usage threshold) files and/or ranges of blocks. This may save disk space without the processing cost of decompressing when a file is read. One embodiment may perform the compression when migrating to a lower storage class for inactive files, as the file system has had time to gather statistics on the file access patterns. This may be used to implement only changing data on the lower storage classes at fixed times.

In one embodiment, when migrating data in files or portions of files to a lower storage class, the data may be compressed. One of the characteristics of files that may be examined by a policy-driven multi-class storage mechanism is files that have not been written to for some period. A typical problem with compression in file systems is that, when a file is to be compressed, it is not known in advance exactly how much compression will be achieved. A file is essentially random-access; if one byte or block in the middle of a compressed file is changed (typically by decompressing the file, changing the byte, and recompressing the file), the change to the byte or block may potentially change the compression size. For an uncompressed file, rewriting one block does not change the file size. If a compressed file is changed, recompressing the file might not leave enough space for the file, as the recompressed file may be larger than the original compressed files.

In one embodiment, files that have not been modified for a period (e.g. a month) may be migrated to a lower storage class. Files from that storage class may be migrated to an even lower storage class if the files are not modified for another, longer period (e.g. six months). The files may be compressed when moving to the even lower storage class based on the polices with confidence that the files are not likely to be uncompressed and modified (the files have not been modified for the longer period, so are not likely to be modified), achieving further cost savings. Using a policy such as this, processing resources are not wasted compressing files that are likely to be uncompressed in the future, and further the problem of not having space for recompressed files described above may be avoided.

Embodiments may implement compression and decompression as part of migration from one storage class to another. In one embodiment, different compression algorithms may be used depending on the type of data being migrated. One embodiment may use a compression algorithm or algorithms that decompresses very fast, with a high a level of compression. Compression may not need to be particularly fast since compression is performed on files that are not likely to be accessed; decompression is performed when access to the file is desired or required, so decompression may have time constraints that compression does not.

Migrating Parts of Files

Embodiments of a system and method for tracking statistics at the subfile level and transparently placing or migrating inactive or less active blocks of data to other storage devices are described. Database users typically want to have their most frequently accessed data on the best quality storage. In database systems, it is common to have only a small part of a database file that is heavily accessed, and other parts of the file that are infrequently accessed if at all. In database files, header timestamps may be continuously updated and thus may always be current, and therefore not useable to detect subfile-level inactivity. Embodiments may provide mechanisms to track statistics at the subfile level of files including, but not limited to, database files, and to transparently place or migrate inactive or less active blocks of data of the files from higher-performing, typically more expensive, storage to lower-performing, typically less expensive, storage, while placing or migrating active blocks of data of the files to higher-performing storage, based on the subfile-level statistics rather than on file-level timestamps.

The tracked subfile-level statistics may include, but are not limited to, file system I/O operation statistics at the subfile level, such as reads and/or writes to the data in the tracked file parts. The subfile-level statistics may be maintained in memory, in a separate file on the file system, or in a combination of the two. Time information on the tracked statistics may be recorded with the statistics; for example the time of the most recent read and/or write to the file part may be tracked and maintained for a file part.

As an example, if an enterprise has a large database (e.g. 1 terabytes) but needs the database to have high performance, the enterprise could buy 1+ terabytes of high-end, expensive storage for the database, but this would not be very economical. Using an embodiment as described herein, if the database only has a fraction that is actively accessed (e.g. 100 gigabytes), the enterprise only needs to buy 100+ gigabytes of high-end, more expensive storage, and 900+ gigabytes of lower-performing, less expensive storage. An embodiment as described herein may then be used to monitor usage pattern of the data and transparently place or migrate the most actively accessed data on the high-end storage at the subfile level, and the rest of the data on the less expensive, lower-performing storage at the subfile level.

File systems typically monitor and keep statistics on a per file basis, not on a subfile basis. In embodiments, file system software monitors and maintains statistics on the subfile level (e.g. block, extent, or ranges of blocks). In extent-based file systems, in one embodiment, subfile-level statistics may be kept for whole extents. In another embodiment, subfile-level statistics may be kept for parts of extents.

In some embodiments, knowledge of file structure (e.g., database file structure), for example knowledge of database partitions with header blocks and data blocks in databases using data partitioning, may be used to separate more active and less active blocks of data of files onto storage with different performance and/or other characteristics. Using embodiments, unused database blocks may be moved to less expensive storage devices or even to offline storage to reduce storage costs without compromising performance. In one embodiment, the database or other application using the data does not have to be idle to perform subfile-level migration. The subfile-level migration may be performed transparently to the application and users of the application. In one embodiment, compression may be used when migrating subfile-level data to less expensive storage devices, or even when migrating data offline, to further reduce storage costs.

In a multi-class file system such as the one described herein, storage devices may be grouped into storage classes according to characteristics including, but not limited to, performance and cost. For example, two or more fast mirrored storage devices (which may be different makes or models) may be grouped in a first storage class, two or more RAID-5 devices may (which may be different makes or models) be grouped in a second storage class, and even slower storage devices (which may be different makes and/or models) may be placed in a third storage class. Embodiments of a system and method for tracking statistics at the subfile level and transparently placing or migrating inactive or less active blocks of data to other storage devices may be implemented in a multi-class file system implemented as described herein to migrate parts of files between storage devices in different storage classes. Note that embodiments may also be implemented in other file systems, including multi-device file systems, implemented on two or more storage devices that may have different characteristics, such as performance and cost, to migrate parts of files between the different storage devices in the file systems.

FIGS. 9 through 13 illustrate means for tracking subfile-level statistics for files on storage devices in a file system, means for determining from the subfile-level statistics for the files one or more parts of the files that can be migrated, and means for migrating the one or more parts of the files to other storage devices of the file system.

Figure 9:
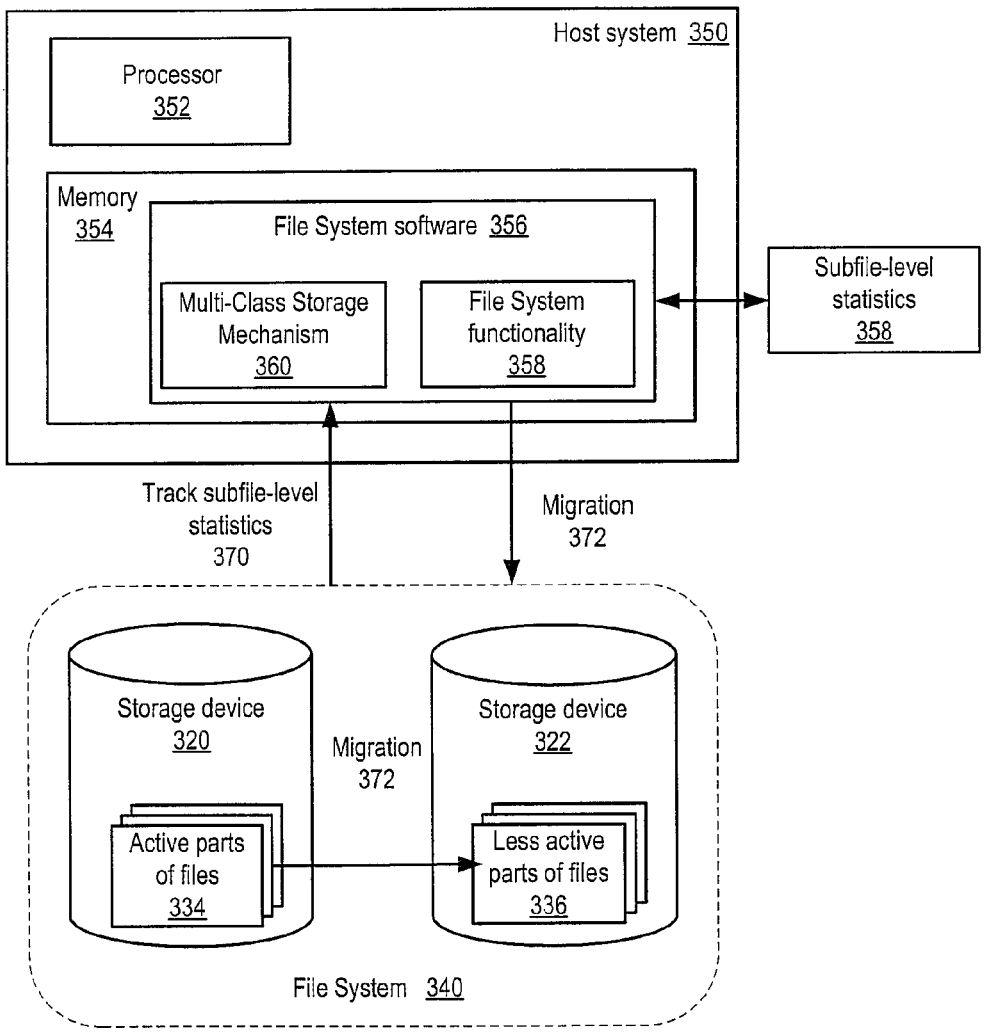
FIG. 9 illustrates a system tracking statistics at the subfile level and transparently placing or migrating inactive or less active blocks of data according to one embodiment.

FIG. 9 illustrates a system tracking statistics at the subfile level and transparently placing or migrating inactive or less active blocks of data according to one embodiment. Note that embodiments may be implemented in network storage environments, or in other storage environments where there may be multiple classes of storage devices. In FIG. 9, host system 350 may be any of various types of devices, including, but not limited to, a personal computer system, desktop computer, laptop or notebook computer, mainframe computer system, workstation, network computer, or other suitable device. Host system 350 may include at least one processor 352. The processor 352 may be coupled to a memory 354. Memory 354 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Host system 350 may couple, for example over a wired or wireless network or networks, to one or more other devices, e.g. client systems, via one or more wired or wireless network interfaces. Host system 350 may couple, for example over a network, to two or more storage devices, in this example storage devices 320 and 322. The network may, for example, be a Storage Area Network (SAN), a LAN with Network-Attached Storage (NAS), or any network capable of coupling storage devices to a host system 350. The storage devices may include any of one or more types of storage devices including, but not limited to, storage systems such as RAID (Redundant Array of Independent Disks) systems, disk arrays, JBODs (Just a Bunch Of Disks, used to refer to disk cabinets that do not have a built-in RAID controller), tape devices, and optical storage devices.

Host system 350 may include, in memory 354, file system software 356. In one embodiment, file system software 356 may include one or more of, but is not limited to, an embodiment of the multi-class storage mechanism 360 and software that provides "traditional" File System functionality 358. File System functionality 358 may be provided by any of various File System implementations including, but not limited to, disk-based file systems such as Veritas' VxFS and UNIX File System (UFS), and networked file system such as Network File System (NFS) and AT&T's Remote File Share (RFS).

File System functionality 358 of file system software 356 may implement, on one or more of the storage devices, a multi-class file system 380 (in this example, on storage devices 320 and 322). One of the methods for implementing a multi-class file system previously described may be used. In one embodiment, the software that provides the File System functionality 358 may be used to implement the multi-class file system 380, while the multi-class storage mechanism 360 manages the policies and directs assignment and migration of data within the multi-class file system 380 according to the user-defined policies.

Note that, in other embodiments, other software than multi-class storage mechanism 360 as described herein (e.g.

another application, or another type of file system software than that described herein) may include functionality for managing the policies and directing assignment and migration of data within the multi-class file system 380 according to the user-defined policies. In one embodiment, file system software may provide an API to one or more functions to enable other applications to implement obtaining and maintaining subfile-level statistics for files in a file system and for migrating parts of those files between storage devices according to the statistics as applied to policies. Also note that embodiments are not limited to the multi-class file system as described herein; in general, embodiments of a system and method for tracking statistics at the subfile level and transparently placing or migrating inactive or less active blocks of data may be implemented in any storage system that includes two or more storage devices distinguishable by one or more characteristics to track statistics at the subfile level and to migrate subfile-level blocks of data to other storage devices.

The multi-class file system 380 may include two or more storage devices organized in a hierarchy of two or more storage classes according to one or more characteristics of the storage devices and/or data requirements of the user(s) of the file system. For example, a multi-class file system 380 may have two storage classes—a first storage class on storage device 320, and a second storage class on storage device 322. The multi-class file system 380 is made available to application(s) as one file system. The structure of the multi-class file system, and assignment and migration of data within the multi-class file system, are transparent to the application(s).

In one embodiment, each storage class of the multi-class file system 380 may have different characteristics such as cost and/or geometry. In one embodiment, the storage classes may form a hierarchy, with the most expensive and typically fastest storage devices in the top or first storage class, and the least expensive (and typically slower) storage devices in the bottom or last storage class.

In embodiments, as indicated at 370, file system software 356 may track subfile-level statistics, and may maintain the subfile-level statistics 358, for example, in memory 354 or in a separate file or files in file system 340. As indicated at 372, file system software 356 may automatically and transparently place in or migrate parts of files to different classes of storage devices according to user-defined policies. Users may define the policies, and file system software 356 may then automatically and transparently place or migrate more active parts of files 334 on faster storage (e.g. storage device 320) and automatically and transparently place or migrate less active or inactive parts of files 336 on inexpensive or secondary storage (e.g. storage device 322) according to the policies. For example, parts of a file that are frequently accessed, such as header blocks of a partitioned database file, may be placed in or migrated to a higher storage class including faster storage devices, and other parts of the file that are less frequently accessed may be placed or migrated to a lower storage class including slower, less expensive storage devices. Data remains online in the same file system regardless of which storage class the files or parts of files containing the data are stored in or migrated to.

Figure 10A:
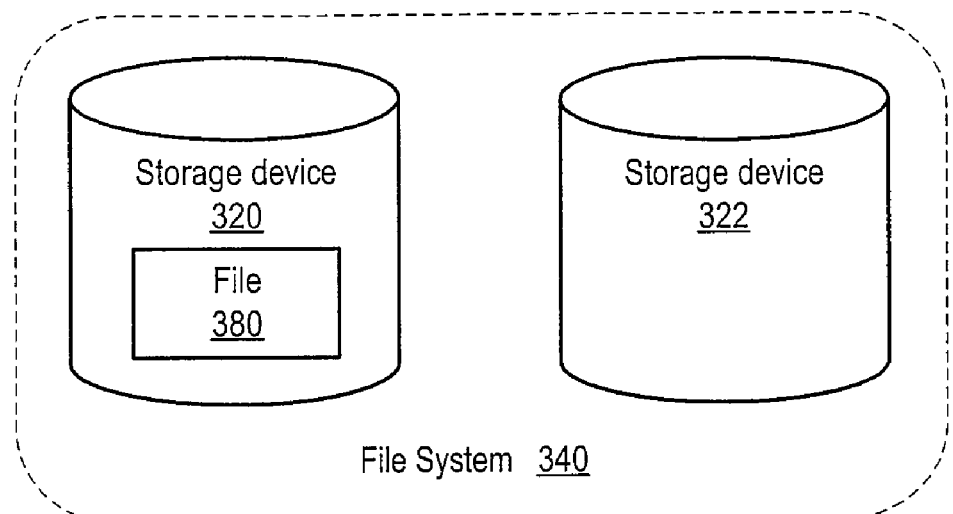
FIGS. 10A and 10B illustrate monitoring and migrating extents of a file according to one embodiment.
Figure 10B:
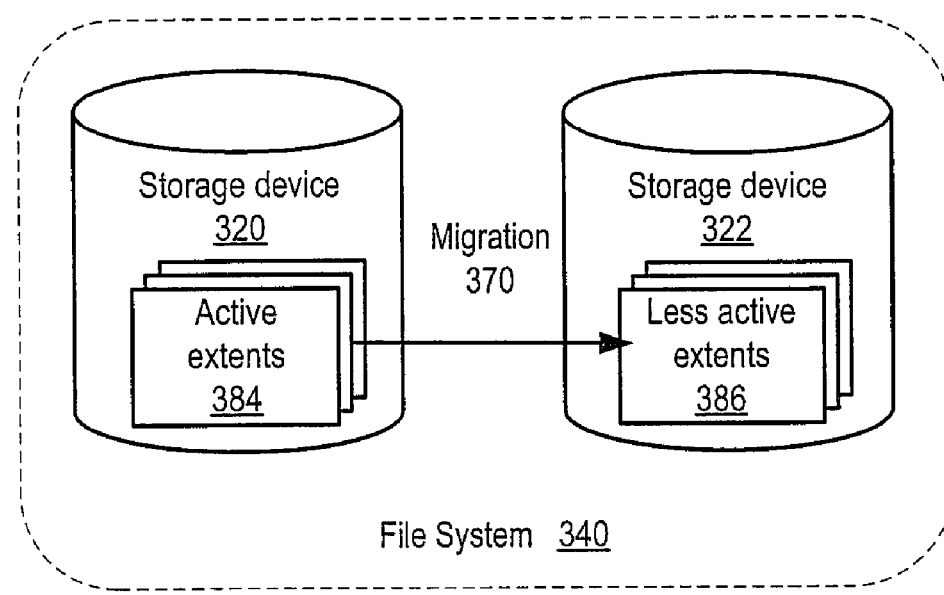

In one embodiment, in extent-based file systems such as Veritas' VxFS, subfile-level statistics for file parts may be tracked at the extent level, and extents may be migrated at the extent level according to the policies. FIGS. 10A and 10B illustrate monitoring and migrating extents of a file according to one embodiment. In one embodiment, less active or aged extents (e.g. extents 386 of FIG. 10B) of files (e.g. file 380 of FIG. 10A) may be moved from higher-performing storage devices, e.g. storage device 320, to other, lower-performing types of storage, e.g. storage device 322, leaving more active extents (e.g. extents 384 of FIG. 10B) on the higher-performing storage device. In one embodiment, if and when all the blocks in an extent are aged, the entire extent may be migrated to a less expensive storage device in the file system or moved offline. Note that, in one embodiment, subfile-level statistics may be tracked for parts of extents (e.g. ranges of blocks within extents), and a part of an extent may be migrated by splitting the extent into two separate extents. Also note that embodiments may also be implemented in non-extent-based file systems to track subfile-level statistics at the block and/or block range level to determine if some blocks or ranges of blocks can be migrated to other storage.

Figure 11:
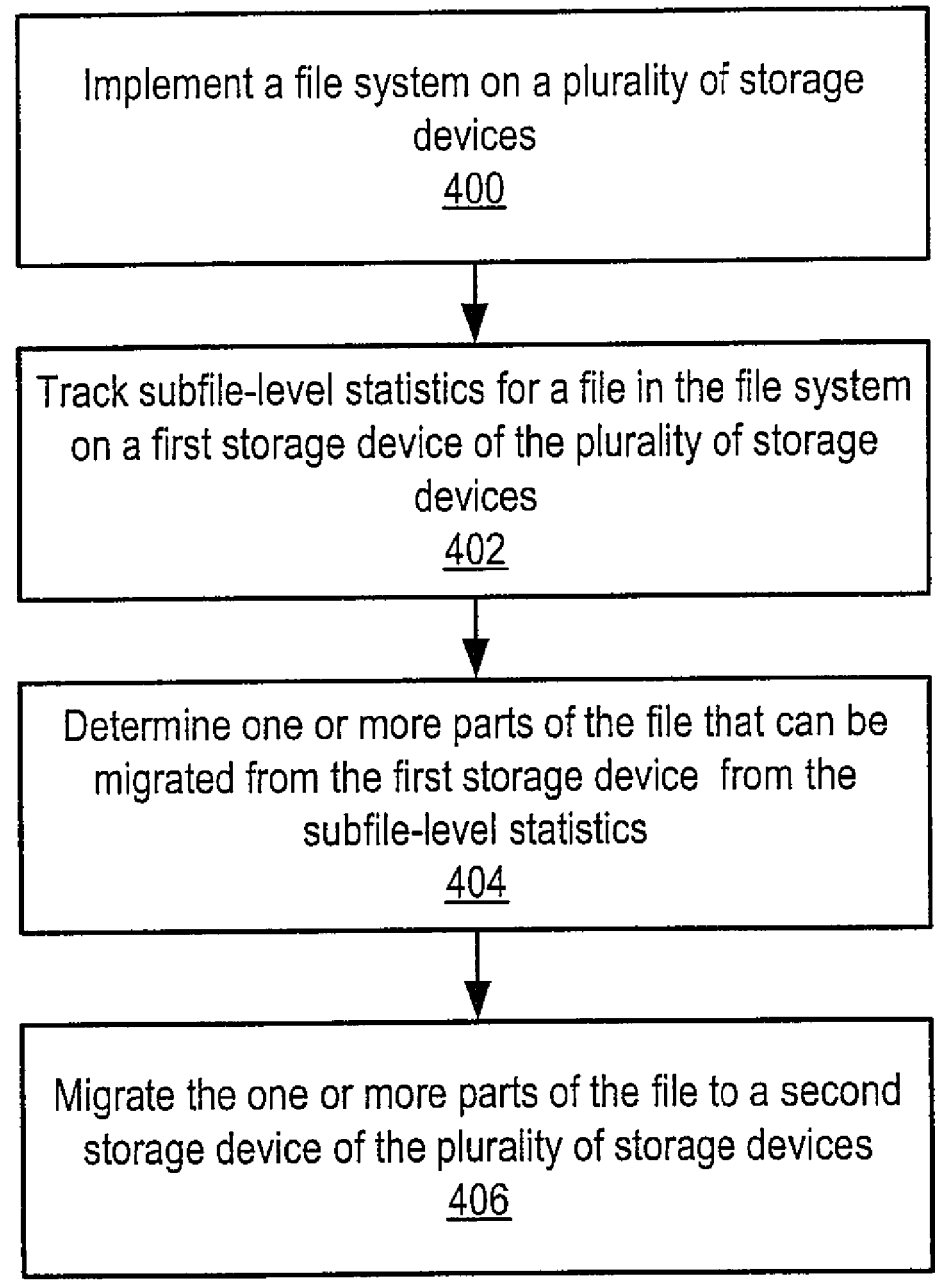
FIG. 11 is a flowchart of a method for tracking subfile-level statistics and migrating parts of file according to one embodiment.

FIG. 11 is a flowchart of a method for tracking subfile-level statistics and migrating parts of file according to one embodiment. As indicated at 400, file system software may implement a file system on a plurality of storage devices. The file system software may provide access to files in the file system to one or more applications. In one embodiment, the file system software may be configured to initially place some parts of files on a first storage device of the plurality of storage devices, and other parts of the file on a second storage device of the plurality of storage devices.

As indicated at 402, the file system software may track subfile-level statistics for a file in the file system on a first storage device of the plurality of storage devices. The subfile-level statistics may include, but are not limited to, file system I/O operation statistics at the subfile level, such as reads and/or writes to the data in the tracked file parts. The tracked file may be a database file or some other type of file. In one embodiment, the file system may be an extent-based file system, and the file system software may be configured to track subfile-level statistics for the file at the extent level and to migrate parts of the file at the extent level. In one embodiment, the file system may be an extent-based file system, and the file system software may be configured to track subfile-level statistics for a file at the sub-extent level and to migrate parts of the file at the sub-extent level. In one embodiment, the file may be a partitioned database file, and the file system software may be configured to track subfile-level statistics for the file at the partition level and to migrate parts of the file at the partition level.

As indicated at 404, the file system software may determine one or more parts of the file that can be migrated from the first storage device from the subfile-level statistics for the file. To determine the parts of the file that can be migrated from the subfile-level statistics, the file system software may apply the subfile-level statistics to a set of policies for the file that may include, but are not limited to, specifications for determining when a file part can be migrated. In one embodiment, the file system software may determine the one or more parts of the file to be migrated to the second storage device are infrequently-accessed parts of the file, and that the other one or more parts of the file to remain on the first storage device are frequently-accessed parts of the file.

As indicated at 406, the file system software may migrate the determined one or more parts of the file to a second storage device of the plurality of storage devices. One or more other parts of the file may be left on the first storage device. In one embodiment, the migrated one or more parts of the file remain online within the file system. In one embodiment, the first storage device is a higher-performance storage device, and the second storage device is a lower-performance storage device. In one embodiment, the file system software may compress the parts of the file migrated to the second storage device. In one embodiment, the migration of the one or more parts of the file to the second storage device may be performed transparent to an application configured to access the file. In one embodiment, the file may be a partitioned database file, the one or more parts of the file migrated to the second storage device may be data blocks, and the one or more other parts of the file that remain on the first storage device may be header blocks. In one embodiment, the file system may be an extent-based file system, and the file may be a database file comprising one or more extents. Each extent may include a header block and a data block. To migrate the one or more parts of the file to the second storage device, the file system software may split each extent into separate extents, with one extent containing the header block and another extent containing the data block, and migrate the extent containing the data block to the second storage device.

Figure 12A:
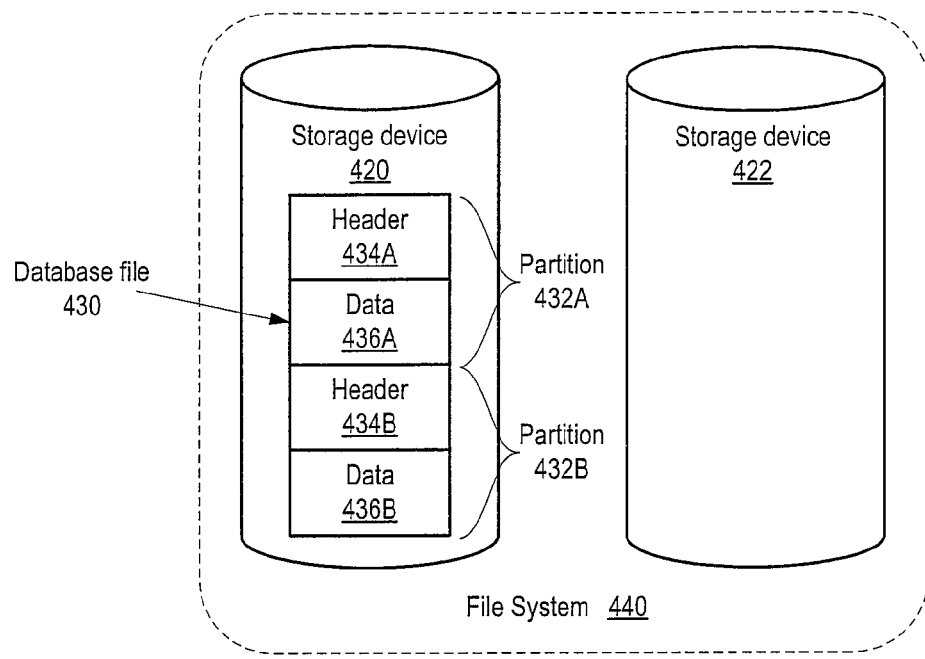
FIGS. 12A and 12B illustrate monitoring and migrating parts of a data partition according to one embodiment.
Figure 12B:
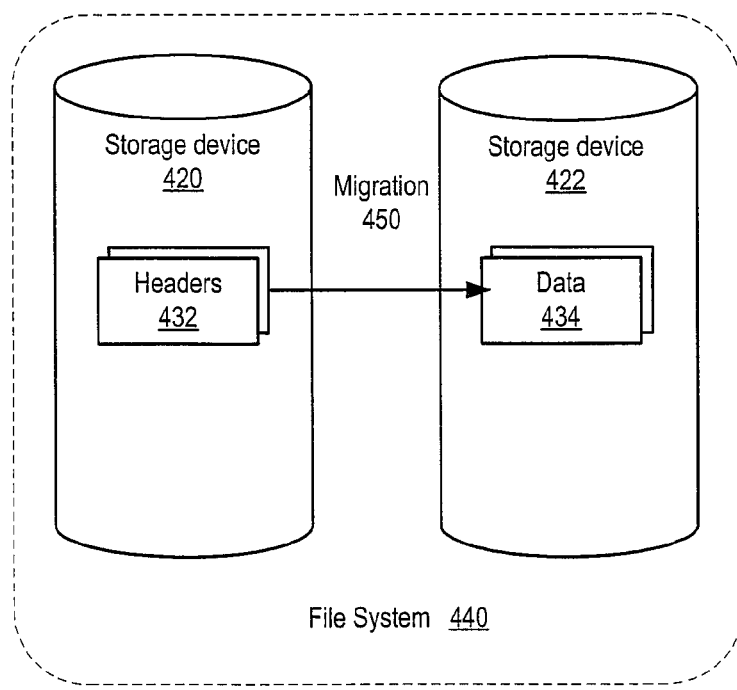

In database systems that use data partitioning, for inactive database partitions (files) whose data have not been queried for a while, typically only the header blocks are being updated on a regular basis. The rest of the blocks are not being accessed. In one embodiment, inactive data blocks may be migrated to less expensive storage automatically and transparently while keeping the headers where they are on higher-performing storage. FIGS. 12A and 12B illustrate monitoring and migrating parts of a data partition according to one embodiment. In this example, database file 430 may include two partitions 432A and 432B. Each partition may include a header 434 and a data block 436. In one embodiment, the data blocks 436 may be migrated to slower storage, e.g. storage device 422, leaving the headers 420 on faster storage, e.g. storage device 420. In one embodiment, new partitioned database files may be created with the headers allocated on a faster storage device and the data blocks allocated on a slower storage device, as further described below.

In one embodiment, the less expensive storage may be online, and the transparent data movement may be performed by the multi-class file system. In one embodiment, the less expensive storage may also include offline storage such as tape. However, after parts of the partitioned database (or other type of) file are migrated to different storage, the entire database file appears to the application(s) and/or user(s) to be online, when in fact only the database file header portion, perhaps a few file system blocks, is actually online.

In one embodiment, in a partitioned database in an extent-based file system, a partition may be allocated as an extent, with a database header at the beginning of the extent, and the rest of the extent may be a for partitioned user data. The partitioned database file may be monitored at the sub-extent level. In order to migrate the data portion of the partition to a slower device, the extent may have to be broken into two extents. The file system software may include a mechanism to split extents. For example, in an extent of 100 megabytes the first two megabytes may be a database header that is constantly being changed. Using the file system software mechanism, the extent may be broken into two extents, with the header in one extent, and the rest (data) in the other extent (98 megabytes, in this example). The two-megabyte extent with the header may be placed or kept on a faster storage device, and the other extent containing the data may be moved to a slower storage device.

In some embodiments, knowledge of file structure (e.g., database file structure), for example knowledge of database partitions with header blocks and data blocks in databases using data partitioning, may be used to separate more active and less active parts of files onto storage with different performance and/or other characteristics.

In one embodiment, when creating a file for a database in an extent-based file system, a separate extent for the database file header (or separate extents for each header, if there is more than one), and one or more extents for the data portion, may be created to facilitate tracking and migrating the one or more extents in the data portion separately from the header. In this embodiment, in databases systems using data partitioning, an inactive partition may have only a single extent (the header) that remains on fast devices or online in the file system, and the rest of the extents may be migrated to slower, less expensive online devices, or even to offline storage. In one embodiment, if a database header is included in an extent with other data, a mechanism may be provided by the file system software to split the extent where the database header is located to generate two extents, one containing only the database header and the other the rest of the split extent. The database header is typically at the start of a database file. In one embodiment, the size of a database header, and other information if needed, may be determined by querying the database system catalogs.

In embodiments, using knowledge of database file structure and/or of the particular database application, different policies for migration may be used for headers and/or other types of parts of database files. For example, different thresholds for migration may be used to determine if and when a header should be migrated and if and when other parts of the file should be migrated. In one embodiment, headers and other parts of database files may be separated onto different storage devices and/or different classes of storage devices when created, or alternatively may be split and placed on different storage devices and/or different classes of storage devices at some point after creation. In one embodiment, all of the database headers from one or more database files may be grouped together on one storage device and/or one type or class of storage device (e.g. the highest-performing storage device(s)), and the remainder of the database file(s) may be placed on a different storage device and/or different type or class of storage device (e.g. lower-performing storage device(s)).

Thus, in one embodiment, database headers may be separated out of the tables and placed on one storage device or class of storage devices without any additional data. In one embodiment, the headers may be stored contiguously on the storage device or class of storage devices. This is not limited to just the header information at the beginning of a database file. In some database files, within each file, there may be multiple headers. For example, in some database files, every megabyte or few hundred kilobytes or megabytes, there may be a header, and the database application may update these headers whenever it touches any of the blocks within the range that that header is associated with. In one embodiment, all of the headers in a database file may be separated out and placed contiguously on one storage device or class of storage devices separately from the rest of the data in the file, which may be placed on a different storage device or class of storage devices.

Figure 13:
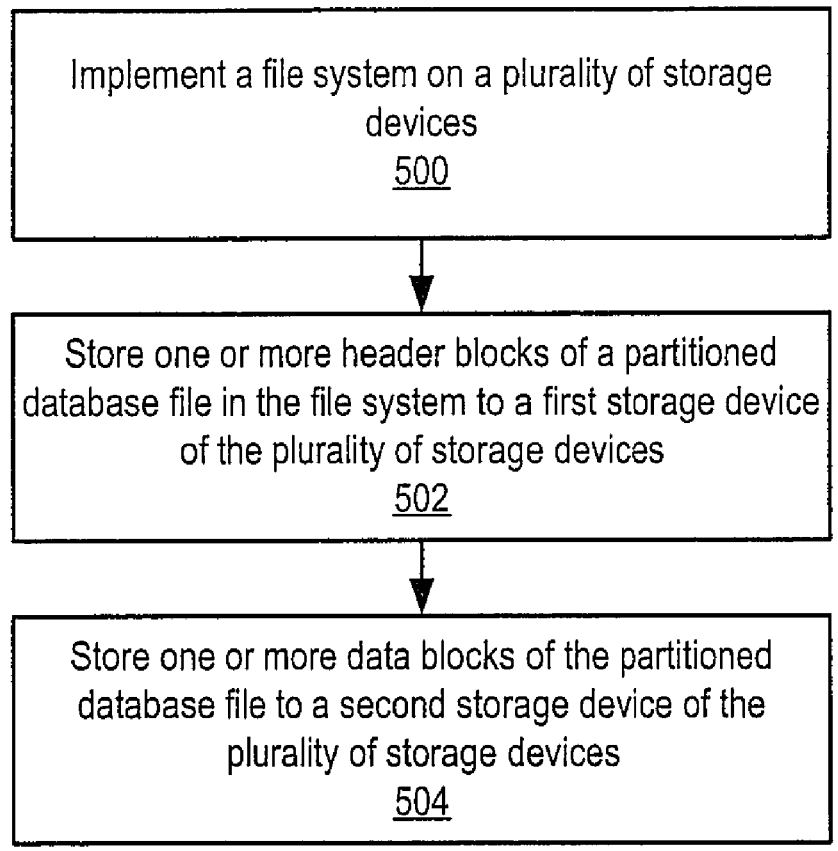
FIG. 13 is a flowchart of a method for separating parts of a partitioned database files onto different storage according to one embodiment.

FIG. 13 is a flowchart of a method for separating parts of a partitioned database files onto different storage according to one embodiment. As indicated at 500, file system software may implement a file system on a plurality of storage devices. The file system software may provide access to files in the file system to one or more applications.

As indicated at 502, the file system software may store one or more header blocks of a partitioned database file in the file system to a first storage device of the plurality of storage devices. In one embodiment, the header blocks are stored in contiguous blocks of storage on the first storage device. As indicated at 504, the file system software may store one or more data blocks of the partitioned database file to a second storage device of the plurality of storage devices. In one embodiment, the first storage device is a higher-performance storage device, and the second storage device is a lower-performance storage device.

The partitioned database file may be a newly-created file, and the header blocks and data blocks may be created on their respective storage device as the file is created. If the partitioned database file is a previously existing file on the first storage device, the data blocks may be migrated from the first storage device to the second storage device at 504. If the file system is an extent-based file system, the partitioned database file may include one or more extents, and each extent may include a header block and a data block. In this case, to migrate the data blocks from the first storage device to the second storage device, the file system software may split each extent into separate extents, with one extent containing the header block and another extent containing the data block, and then migrate the extent(s) containing the data block to the second storage device.

The file system software may then track subfile-level statistics for the partitioned database file to determine parts of the file that can be migrated to other storage devices. The determined parts of the partitioned database file may then be transparently migrated to the other storage device. In one embodiment, the migrated one or more parts of the partitioned database file remain online within the file system.

One embodiment may provide a database file creation utility or mechanism through which a database header size can be specified, and the database header blocks and associated data blocks may be allocated separately, for example as separate extents. The database header blocks may be allocated on faster storage, and the associated data blocks on slower storage.

Note that, while the above is described primarily for partitioned databases, embodiments may be applied to any database format. Also note that, while the above is described primarily for databases, embodiments may be applied to any application that stores multiple classes or types of data within the same file and/or file format. In general, all embodiments that reference databases may be applied to other applications than databases. For any such file (database file or other type of file), the file may be divided into subfiles, for example at the block level, extent level, or for ranges of blocks. File usage and access patterns may be monitored at the subfile level. The most active parts of the file may be placed or migrated to a faster, more expensive, storage device, and the less active parts of the file may be transparently placed or migrated to a slower, less expensive, storage device according to policies. Note that performance and cost of the storage devices are not the only characteristics that may be used by the policies to place and migrate files and/or parts of files. Another exemplary characteristic is storage capacity. In general, any characteristic that the user deems important may be used to place and migrate files and/or parts of files.

Also note that, while the above description primarily describes tracking subfile-level statistics and migrating less active parts of files to slower storage, embodiments may also track subfile-level statistics for parts of files on lower-performing storage and, if a part of the file is determined to be active enough according to the policies, migrate the part of the file to higher-performing storage. Further, in one embodiment, the policies may be used to specify that certain files or parts of files are to be always maintained on certain types of storage, for example on a higher-performing or lower-performing storage device.

In one embodiment, the File System functionality of File System software may provide a set of mechanisms and/or an interface to a set of mechanisms for tracking subfile-level statistics and data movement, and a multi-class storage mechanism may use the subfile-level statistics to determine if and when to move parts of files according to the policies. The policies may be established by a user or administrator, and the tracking and migration may be performed automatically and transparently to applications and users. In one embodiment, File System software may provide an interface to a set of file system primitives that allow other applications to gather subfile-level statistics themselves and to migrate parts of files based on the statistics. Alternatively, File System software may provide mechanisms and/or an interface to a set of mechanisms that allow to access the subfile-level statistics gathered by the File System software and to migrate parts of files based on the statistics.

In one embodiment, the set of mechanisms provided by the File System functionality of File System software may provide a mechanism that, for a partitioned database or other file type, may be used to specify that a partition (or part of a file) of a certain age can be migrated to other storage. This mechanism may be used to determine which parts of a partition or file can be kept on faster storage, and which can be moved to slower storage. In one embodiment, the set of mechanisms provided by the File System functionality of File System software may provide a mechanism that can be used to specify data monitoring granularity, e.g. at 10 megabyte or 100 megabyte granularity. In one embodiment, in an extent-based file system, files may then be monitored at the specified granularity within each extent, and extents may be split and moved dynamically and transparently at the specified level of granularity.

Because a file may be stored on multiple devices once the less-active parts are moved to slower storage and the more-active parts are left on faster storage, one embodiment may provide a defragmentation utility that works across multiple devices for a single file.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:
1. A system, comprising:
a processor; and
a memory comprising program instructions, wherein the program instructions are executable by the processor to implement file system software configured to:

establish and manage a file system on a plurality of storage devices;

provide access to files in the file system to one or more applications, wherein each file comprises one or more file parts;

store one or more header blocks of a partitioned database file in the file system to a first storage device of the plurality of storage devices; and store one or more data blocks of the partitioned database file to a second storage device of the plurality of storage devices;

wherein both the one or more header blocks and the one or more data blocks of the partitioned database file are online within the file system.

2. The system as recited in claim 1, wherein the header blocks are stored in contiguous blocks of storage on the first storage device.

3. The system as recited in claim 1, wherein the file system software is further configured to:

track subfile-level statistics for the partitioned database file;

determine from the subfile-level statistics for the partitioned database file one or more parts of the partitioned database file that can be migrated to a different one of the plurality of storage devices; and migrate the one or more parts of the partitioned database file to the different storage device of the plurality of storage devices, wherein said migration is transparent to an application that accesses the partitioned database file;

wherein one or more other parts of the partitioned database file remain on the original storage device.

4. The system as recited in claim 3, wherein the migrated one or more parts of the partitioned database file remain online within the file system.

5. The system as recited in claim 1, wherein the first storage device is a higher-performance storage device, and wherein the second storage device is a lower-performance storage device.

6. The system as recited in claim 1, wherein the partitioned database file is a newly-created file.

7. The system as recited in claim 1, wherein the partitioned database file is an existing file on the first storage device, and wherein, to store one or more data blocks of the partitioned database file to a second storage device of the plurality of storage devices, the file system software is further configured to migrate the one or more data blocks from the first storage device to the second storage device.

8. The system as recited in claim 7, wherein the file system is an extent-based file system, wherein the partitioned database file comprises one or more extents, wherein each extent comprises a header block and a data block, and wherein, to migrate the one or more data blocks from the first storage device to the second storage device, the file system software is further configured to:

split each extent into separate extents, with one extent comprising the header block and another extent comprising the data block; and migrate the extent comprising the data block to the second storage device.

9. The system as recited in claim 1, wherein the file system software is further configured to implement a hierarchy of storage classes of a multi-class file system, wherein the first storage device is in a first storage class of the multi-class file system, and wherein the second storage device is in a second storage class of the multi-class file system.

10. A system, comprising:

a plurality of storage devices;

a host system configured to couple to the plurality of storage devices via a network, wherein the host system comprises file system software configured to:

establish and manage a file system on the plurality of storage devices;

provide access to files in the file system to one or more applications, wherein each file comprises one or more file parts;

store one or more header blocks of a partitioned database file in the file system to a first storage device of the plurality of storage devices; and store one or more data blocks of the partitioned database file to a second storage device of the plurality of storage devices;

wherein both the one or more header blocks and the one or more data blocks of the partitioned database file are online within the file system.

11. A system, comprising:

means for storing one or more header blocks of a partitioned database file in a file system to a first storage device of a plurality of storage devices; and means for storing one or more data blocks of the partitioned database file to a second storage device of the plurality of storage devices;

wherein both the one or more header blocks and the one or more data blocks of the partitioned database file are online within the file system.

12. A method, comprising:

establishing and managing, by file system software, a file system on a plurality of storage devices;

providing, by the file system software, access to files in the file system to one or more applications, wherein each file comprises one or more file parts;

storing, by the file system software, one or more header blocks of a partitioned database file in the file system to a first storage device of the plurality of storage devices; and storing, by the file system software, one or more data blocks of the partitioned database file to a second storage device of the plurality of storage devices;

wherein both the one or more header blocks and the one or more data blocks of the partitioned database file are online within the file system.

13. The method as recited in claim 12, wherein the header blocks are stored in contiguous blocks of storage on the first storage device.

14. The method as recited in claim 12, further comprising:

tracking, by the file system software, subfile-level statistics for the partitioned database file;

determining, by the file system software, from the subfile-level statistics for the partitioned database file one or more parts of the partitioned database file that can be migrated to a different one of the plurality of storage devices; and migrating, by the file system software, the one or more parts of the partitioned database file to the different storage device of the plurality of storage devices, wherein said migration is transparent to an application that accesses the partitioned database file;

wherein one or more other parts of the partitioned database file remain on the original storage device.

15. The method as recited in claim 14, wherein the migrated one or more parts of the partitioned database file remain online within the file system.

16. The method as recited in claim 12, wherein the first storage device is a higher-performance storage device, and wherein the second storage device is a lower-performance storage device.

17. The method as recited in claim 12, wherein the partitioned database file is a newly-created file.

18. The method as recited in claim 12, wherein the partitioned database file is an existing file on the first storage device, and wherein said storing one or more data blocks of the partitioned database file to a second storage device of the plurality of storage devices comprises migrating the one or more data blocks from the first storage device to the second storage device.

19. The method as recited in claim 18, wherein the file system is an extent-based file system, wherein the partitioned database file comprises one or more extents, wherein each extent comprises a header block and a data block, and wherein said migrating the one or more data blocks from the first storage device to the second storage device comprises:
 splitting each extent into separate extents, with one extent comprising the header block and another extent comprising the data block; and
 migrating the extent comprising the data block to the second storage device.

20. The method as recited in claim 12, further comprising implementing, by the file system software, a hierarchy of storage classes of a multi-class file system, wherein the first storage device is in a first storage class of the multi-class file system, and wherein the second storage device is in a second storage class of the multi-class file system.

21. A non-transitory computer-accessible storage medium comprising program instructions, wherein the program instructions are configured to implement:
 establishing and managing a file system on a plurality of storage devices;
 providing access to files in the file system to one or more applications, wherein each file comprises one or more file parts;
 storing one or more header blocks of a partitioned database file in the file system to a first storage device of the plurality of storage devices; and
 storing one or more data blocks of the partitioned database file to a second storage device of the plurality of storage devices;
 wherein both the one or more header blocks and the one or more data blocks of the partitioned database file are online within the file system.

22. The non-transitory computer-accessible storage medium as recited in claim 21, wherein the header blocks are stored in contiguous blocks of storage on the first storage device.

23. The non-transitory computer-accessible storage medium as recited in claim 21, wherein the program instructions are further configured to implement:
 tracking subfile-level statistics for the partitioned database file;
 determining from the subfile-level statistics for the partitioned database file one or more parts of the partitioned database file that can be migrated to a different one of the plurality of storage devices; and
 migrating the one or more parts of the partitioned database file to the different storage device of the plurality of storage devices, wherein said migration is transparent to an application that accesses the partitioned database file;
 wherein one or more other parts of the partitioned database file remain on the original storage device.

24. The non-transitory computer-accessible storage medium as recited in claim 23, wherein the migrated one or more parts of the partitioned database file remain online within the file system.

25. The non-transitory computer-accessible storage medium as recited in claim 21, wherein the first storage device is a higher-performance storage device, and wherein the second storage device is a lower-performance storage device.

26. The non-transitory computer-accessible storage medium as recited in claim 21, wherein the partitioned database file is a newly-created file.

27. The non-transitory computer-accessible storage medium as recited in claim 21, wherein the partitioned database file is an existing file on the first storage device, and wherein, in said storing one or more data blocks of the partitioned database file to a second storage device of the plurality of storage devices, the program instructions are further configured to implement migrating the one or more data blocks from the first storage device to the second storage device.

28. The non-transitory computer-accessible storage medium as recited in claim 27, wherein the file system is an extent-based file system, wherein the partitioned database file comprises one or more extents, wherein each extent comprises a header block and a data block, and wherein, in said migrating the one or more data blocks from the first storage device to the second storage device, the program instructions are further configured to implement:
 splitting each extent into separate extents, with one extent comprising the header block and another extent comprising the data block; and
 migrating the extent comprising the data block to the second storage device.

29. The non-transitory computer-accessible storage medium as recited in claim 21, wherein the program instructions are further configured to implement a hierarchy of storage classes of a multi-class file system, wherein the first storage device is in a first storage class of the multi-class file system, and wherein the second storage device is in a second storage class of the multi-class file system.

* * * * *